(12) United States Patent  
Pecci et al.

(10) Patent No.: US 6,568,428 B2  
(45) Date of Patent: May 27, 2003

(54) BACKWASH VALVE

(75) Inventors: Gene L. Pecci, Marin County, CA (US); Bruce W. Maskell, Solano County, CA (US)

(73) Assignee: Laars, Inc., Newport Beach, CA (US)

( * ) Notice: Subject to any disclaimer, the term of this patent is extended or adjusted under 35 U.S.C. 154(b) by 188 days.

(21) Appl. No.: 09/812,104

(22) Filed: Mar. 19, 2001

(65) Prior Publication Data

US 2001/0011557 A1 Aug. 9, 2001

Related U.S. Application Data

(63) Continuation-in-part of application No. 09/121,420, filed on Jul. 23, 1998, now Pat. No. 6,240,941.

(51) Int. Cl.[7] ............................................. F16K 11/076
(52) U.S. Cl. ................... 137/597; 137/595; 137/625.17
(58) Field of Search ................................ 137/597, 595, 137/594, 625.17, 625.18

(56) References Cited

U.S. PATENT DOCUMENTS

| 413,671 A | 10/1889 | Jewell |
| 860,672 A | 7/1907 | Ladd |
| 1,244,552 A | 10/1917 | Shelor |
| 1,270,722 A | 6/1918 | Gillette |
| 2,137,406 A | 11/1938 | Johnson |
| 2,145,132 A | 1/1939 | Riney et al. |
| 2,662,549 A | 12/1953 | Rhinehart et al. |
| 2,766,771 A | 10/1956 | Wenzel |
| 3,166,499 A | 1/1965 | Rudelick |
| 3,195,726 A | 7/1965 | Saurenman et al. |
| 3,233,865 A | 2/1966 | Panzica et al. |
| 3,365,064 A | 1/1968 | Horan, Jr. |
| 3,471,021 A | 10/1969 | Prizler |
| 3,489,178 A | 1/1970 | Kice |
| 3,499,467 A | 3/1970 | McCord et al. |
| 3,595,270 A | 7/1971 | McNeal, Jr. |
| 3,670,893 A | 6/1972 | Seid |
| 3,721,268 A | 3/1973 | Erlich et al. |
| 3,834,537 A | 9/1974 | Brett |
| 3,874,413 A | 4/1975 | Valdez |
| 3,907,688 A | 9/1975 | Close |
| 3,938,553 A | 2/1976 | Ortega |
| 3,962,089 A | 6/1976 | Fulukawa |
| 4,062,777 A | 12/1977 | Tsuruta et al. |
| 4,137,934 A | 2/1979 | Rice et al. |
| 4,312,377 A | 1/1982 | Knecht |
| 4,355,659 A | 10/1982 | Kelchner |
| 4,466,457 A | 8/1984 | Brane et al. |
| 4,469,131 A | 9/1984 | Traylor |
| 4,545,905 A | 10/1985 | Poe |

(List continued on next page.)

Primary Examiner—Kevin Lee  
(74) Attorney, Agent, or Firm—Buchanan Ingersoll, P.C.

(57) ABSTRACT

A valve is provided having a housing defining first and second flow areas. First, second and third flow ports open into the first flow area, while fourth and fifth flow ports open into the second flow area. A flow passage is provided having one end opening into the first flow port and another end opening into the second flow area. First and second flow control gates are disposed in the first and second flow areas, respectively, and are rotatable between first and second positions. With the first and second gates in the first position, the first gate seals off the third flow port opening such that the first and second flow ports are in fluid communication via the first flow area, and the second gate seals off the flow passage opening such that the fourth and fifth flow ports are in fluid communication via the second flow area. With the first and second gates in the second position, the first gate seals off the first flow port opening such that the second and third flow ports are in fluid communication via the first flow area, and the second gate seals off the fourth flow port opening such that the first and fifth flow ports are in fluid communication via the flow passage and the second flow area.

23 Claims, 24 Drawing Sheets

U.S. PATENT DOCUMENTS

| | | |
|---|---|---|
| 4,553,566 A | 11/1985 | Barclay et al. |
| 4,555,334 A | 11/1985 | Cohen |
| 4,564,451 A | 1/1986 | Cohen |
| 4,579,143 A * | 4/1986 | Rollins et al. .......... 137/597 X |
| 4,655,252 A | 4/1987 | Krumhansl |
| 4,669,503 A | 6/1987 | McGarrity et al. |
| 4,678,564 A | 7/1987 | Moorehead et al. |
| 4,714,551 A | 12/1987 | Bachhofer et al. |
| 4,774,977 A | 10/1988 | Cohen |
| 4,909,933 A | 3/1990 | Carter et al. |
| 4,921,598 A | 5/1990 | Desch |
| 5,073,260 A | 12/1991 | Wilkendorf |
| 5,152,321 A | 10/1992 | Drager et al. |
| 5,366,021 A | 11/1994 | Coleman |
| 5,427,141 A | 6/1995 | Ohtsubo |
| 5,437,304 A | 8/1995 | Delcroix |
| 5,505,844 A | 4/1996 | Porter |
| 5,642,756 A | 7/1997 | Lawrence et al. |
| 5,937,903 A * | 8/1999 | Afshar et al. .......... 137/597 X |
| 6,240,941 B1 * | 6/2001 | Small et al. ............ 137/595 X |

\* cited by examiner

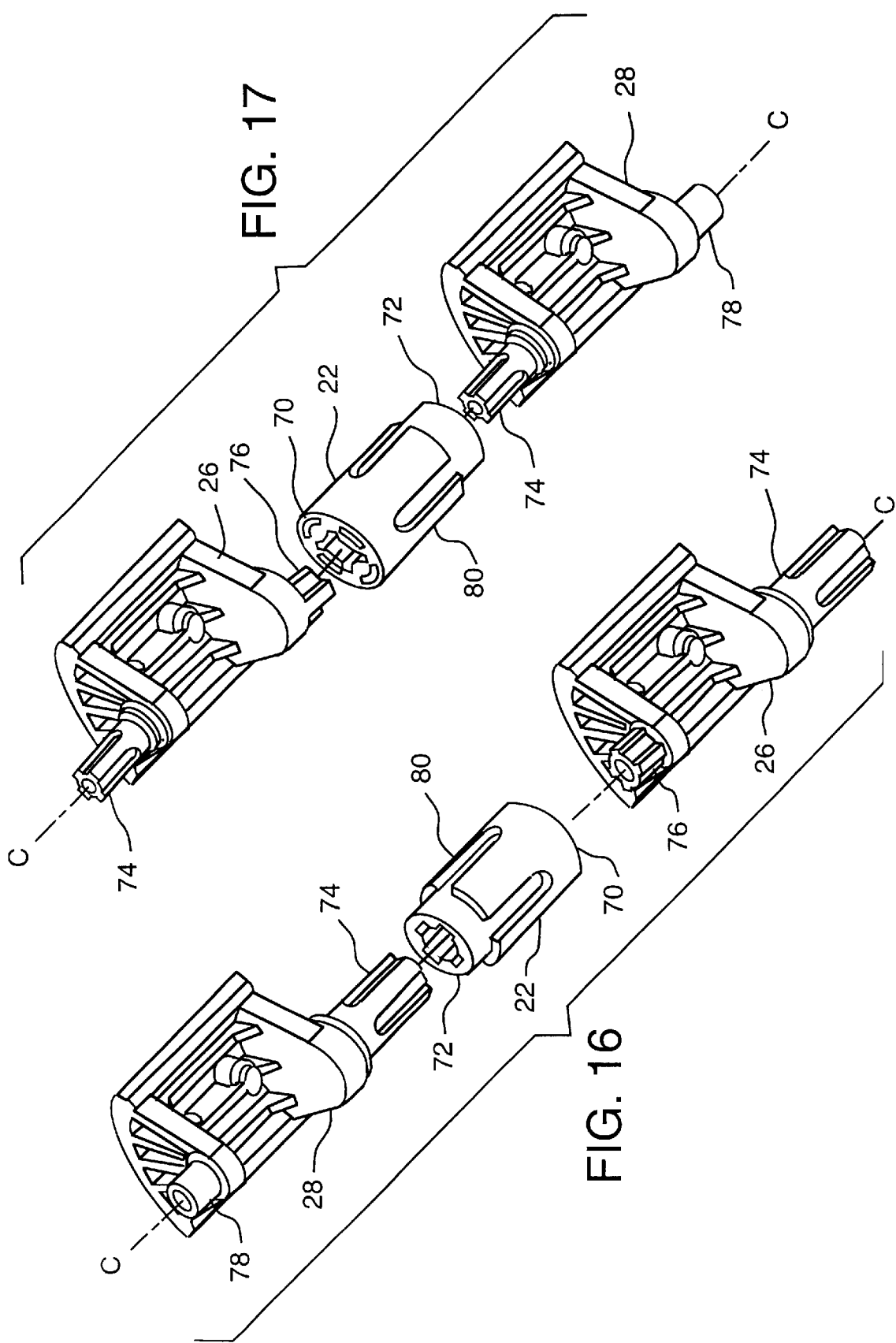

BACKWASH VALVE

CROSS-REFERENCE TO RELATED APPLICATIONS

The present application is a continuation-in-part of application Ser. No. 09/121,420, filed Jul. 23, 1998, now U.S. Pat. No. 6,240,941.

FIELD OF THE INVENTION

The present invention is directed toward valves and, more particularly, toward interconnectable valves for use in controlling the flow of fluids within pipelines and other conduits and for changing flow paths of the fluids.

BACKGROUND OF THE INVENTION

A variety of different valves have been developed for controlling fluid flow through pipelines. Most valves, regardless of type, include a housing member that operably supports a flow control member therein. The housing typically has two or more flow ports that are constructed for attachment to corresponding portions of pipelines or other conduits. Some of the ports may be provided with threaded connections, while other may utilize a "slip fit" connection wherein a section of pipeline is slidably received in a socket formed in the valve housing. The pipe is then typically retained within the socket by an appropriate attachment medium or adhesive. For example, the pipe may be affixed to the socket by welding, soldering, gluing, and the like.

The flow control characteristics afforded by a valve are generally dependent on the type of flow control member employed by the valve and the configuration of the flow ports. In many pipeline applications, it is desirable to utilize valves that divert fluid flow from one port to another. In those instances, diverting valves are typically employed. For example, in one application, water flow from a water heater may be diverted to either a pool or a spa by way of a diverting valve. In another application, a diverting valve may be utilized in connection with a filtering system for a pool or other fluid source. Water from a pool may be diverted to either a filter input or output port for either filtering the pool water or backwashing the filter.

A number of differently configured diverting valves exist for diverting fluid flow between ports. One type of diverting valve utilizes a "ball" or "disc" that essentially fills the core of the valve body except for a flow passage provided through the ball or disc. The ball or disc may be rotatably or slidably supported within the valve body and is adapted to sealingly engage the seats adjacent to the ports of the valve such that flow occurs only through the ports that are aligned with the flow passage. The other ports are either sealed off by the ball or disc, or sealed off by another valve member operating in conjunction with the ball or disc. Another type of diverting valve utilizes a diverting member, or gate, that sealingly engages a seat adjacent to a port so as to prevent fluid flow through that particular port. The diverting member may be either rotatably or slidably supported within the valve body such that the diverting member may be rotated or slid so as to prevent fluid flow through a port when in one position (sealingly engaging the port seat) and permit fluid flow through that port in another position (moved away from the port seat). Thus, ball, disc, and diverter-type valves may be utilized to divert fluid flow by rotating or sliding the ball, disc or diverting member to seal the appropriate port or ports through which fluid flow is not desired, while generally permitting fluid flow through the other ports.

In those applications where the diverting valve is to be used for directing fluid to and from a backwashable filter, the construction of such valves typically becomes complex. Diverting valves designed for these applications find particular utility for use in connection with a swimming pool filtering system. In one position (filter position), the diverting valve permits water from the swimming pool to pass through the filter, where it is filtered via conventional filtering media, and flow back into the swimming pool. In another position (backwash position), the diverting valve directs water from the swimming pool through the filter in an opposite direction to thereby backwash the filtering media therein. The diverting valve then directs the backwashed water, containing contaminants backflushed from the filtering media, to a drain.

Multiport valves and slide valves are two common valve types utilized in such backwashing applications. However, both multiport and slide valves are typically expensive to manufacture due to the complexities of their construction, and tend to be difficult to actuate between the filter and backwash positions as a result of their internal configurations. Further, certain of the internal parts in these multiport and slide valves tend to wear out quickly, and thus require frequent replacement.

In other applications, it is desirable to utilize "shut off" valves that selectively permit or prevent fluid flow through the valve. Ball, disc and diverter-type valves have also been configured to serve as shut off valves.

Depending upon the particular application, at times it may be desirable to utilize valves with different numbers of ports and/or different port configurations. For example, in certain pipeline arrangements, it may be desirable to have a valve configured with only two ports. Two-port shut off valves are commonly used to selectively permit or prevent fluid flow from a first conduit to a second conduit. In other pipeline applications, it may be desirable to have a valve configured with three ports. In a three-port valve, fluid flow from a first conduit may be selectively routed to either a second conduit or a third conduit by properly orienting a ball, disc, or diverting member supported within the valve housing. In still other pipeline applications, it may be desirable to have a valve configured with four ports. A four-port diverting valve may be utilized to permit fluid flow from a first conduit to a second conduit in a first position, and permit fluid flow from a third conduit to a fourth conduit in a second position, while prohibiting fluid flow between the other two conduits in each position.

It may also be useful to interconnect multiple valve bodies together into a single "stacked valve" in certain pipeline applications. In those applications, the valve bodies are typically coupled, or "stacked", perpendicularly to the direction of fluid flow. In certain stacked valve arrangements, it may be desirable for the flow control member (ball, disc, diverting member, etc.) of each valve to be interconnected and commonly actuatable. Thus, multiple sources of fluid flow may be diverted and/or shut off simultaneously.

While such valves can effectively divert or shut off fluid flow through a pipeline, conventional stacked valve designs have various shortcomings. Certain conventional stacked valves permit the valve bodies and flow control members to be rotated in relationship to one another. Stacked valves of this type, however, typically have no separator between the valve bodies or the flow control members, and require that a weld, which holds the valve bodies together, be removed in order to accomplish the rotation. Of course, after rotation, the valve bodies must be re-welded to reconnect them into a single unit. Such assembly and disassembly procedure are costly and time consuming, which, in addition to increasing the operational costs involved, can lead to undesirable downtime of the piping system. In other conventional stacked valves, a spring detent must be modified in order to properly locate the plugs of the valve when the bodies are rotated. This also can result in undesirable downtime depending upon the difficulty in such modification.

It will appreciated that while interconnecting valves can make field installation more efficient, by allowing preconfiguration of what would have been multiple parts in a conventional system, changes are sometimes required to meet varying filed conditions. Such field changes to conventional stacked or interconnected valves are, however, typically time consuming and costly in the form of labor expenses and production downtime.

Also, in many pipeline applications, to obtain the desired flow control capabilities, it may be necessary to provide fluid flow control from one valve to another. Flow between valves has previously been accomplished by providing conduit to form an external pipeline that connects a port of one valve to the port or ports of one or more other valves. As may be appreciated, the piping materials and labor required for such external connections are costly and fabrication of the external piping is time consuming. Using external piping to provide fluid flow from one valve to another also requires that each valve be provided with an additional port for connection to the external piping.

The present invention is directed toward overcoming one or more of the above-mentioned problems.

SUMMARY OF THE INVENTION

The present invention is directed toward a valve for diverting fluid flow. The valve includes at least two valve bodies, with each valve body having an annular chamber and at least one port therethrough. The valve also includes an adjoining member extending intermediate the valve bodies and removably attached to the valve bodies, and a flow control member operably disposed in the annular chamber of each valve body. The valve may also include a rotatable adapter received within the adjoining member and engaging the flow control members.

In one embodiment of the valve, the flow control members are engagable with the adapter in a plurality of orientations about an actuating axis extending through the valve. In another embodiment, the valve bodies of the valve are engageable with the adjoining member in a plurality of orientations about the actuating axis.

In yet another embodiment of the valve, the adjoining member includes a flow passage in fluid communication with the annular chambers of the valve bodies.

Another embodiment of the present invention is directed toward a valve having an actuating axis, and a first valve body that includes at least one port and an annular chamber. The annular chamber extends from a first flange to a second flange and is coaxially aligned with the actuating axis. The valve also has a second valve body that includes at least one port and an annular chamber. The annular chamber extends from a first flange to a surface, and is coaxially aligned with the actuating axis. The valve also includes a first flow control member disposed in the annular chamber of the first valve body and coaxially aligned with, and rotatable about, the actuating axis. The valve further includes a second flow control member disposed in the annular chamber of the second valve body and coaxially aligned with, and rotatable about, the actuating axis. The valve also includes an adjoining member coaxially aligned with the actuating axis and connected to the second flange of the first valve body and the first flange of the second valve body. The valve further includes an adapter, corresponding to each adjoining member and housed therein, that is coaxially aligned with, and rotatable about, the actuating axis and is connected to the first and second control members. The valve also includes a cover connected to the first flange of the first valve body.

Another embodiment of the present invention has at least two valve bodies and means for connecting the valve bodies such that each valve body may be removed from the connecting means.

Yet another embodiment of the present invention is directed toward a valve including two ported valve bodies having a flow control member operably supported in one of the valve bodies, the flow control member having at least one actuator stem. The valve also includes another flow control member operably supportable in the other valve body, the another flow control member also having at least one actuator stem. In addition, the valve has a connector extending between the valve bodies and attachable to the valve bodies. The connector engages one of the actuator stems on the flow control member and one of the actuator stems on the another flow control member.

A further embodiment of the present invention is directed toward a valve including a housing defining first and second flow areas. First, second and third flow ports open into the first flow area, while fourth and fifth flow ports open into the second flow area. A flow passage is provided having one end opening into the first flow port and another end opening into the second flow area. First and second flow control gates are disposed in the first and second flow areas, respectively, and are rotatable between first and second positions. With the first and second gates in the first position, the first gate seals off the third flow port opening such that the first and second flow ports are in fluid communication via the first flow area, and the second gate seals off the flow passage opening such that the fourth and fifth flow ports are in fluid communication via the second flow area. With the first and second gates in the second position, the first gate seals off the first flow port opening such that the second and third flow ports are in fluid communication via the first flow area, and the second gate seals off the fourth flow port opening such that the first and fifth flow ports are in fluid communication via the flow passage and the second flow area.

In one form of the further embodiment, the valve includes an actuating axis extending therethrough, with the first and second flow areas coaxially aligned the actuating axis. The first and second flow control gates are coaxially aligned with and rotatable about the actuating axis between the first and second positions.

The valve may further include a shaft disposed in the housing and connecting the first and second gates for simultaneous rotation thereof between the first and second positions. At least one of the first and second gates includes a projection extending from the housing and configured for attachment to a handle for rotation of the first and second gates between the first and second positions. Preferably, the projection extends from the housing along the actuating axis.

In another form of the further embodiment, the housing includes first and second stop projections extending therefrom and positioned to engage the handle and prevent rotation thereof in first and second rotational directions, respectively. Engagement of the handle with the first stop projection defines the first position of the first and second gates, and engagement of the handle with the second stop projection defines the second position of the first and second gates.

The housing may include first and second housing elements connected together by welding, soldering, gluing, and the like. The first housing element defines the first flow area, the first, second and third flow ports, and a portion of the flow passage. The second housing element defines the second flow area, the fourth and fifth flow ports, and a portion of the flow passage.

Preferably, the first and second flow ports are disposed on opposite sides of the housing and lie along the first flow axis. The third flow port lies along the second flow axis that intersects the first flow axis. Preferably, the first flow axis is perpendicular to the second flow axis.

The fourth and fifth flow ports are also preferably disposed on opposite sides of the housing and lie along a third flow axis. Preferably, the first and third flow axes are parallel.

The valve according to the further embodiment may be configured for connection to a filtering system for a fluid source. When connected in such a manner, the first position of the first and second gates defines a filter position, while the second position of the first and second gates defines a backwash position. Preferably, the first position of the first and second gates is oriented ninety-degrees from the second position of the first and second gates.

Typically, when configured for connection to a filtering system, the valve is connected directly to a filter included in the filtering system. Generally, the first and fourth flow ports are disposed on one side of the housing and the second and fifth flow ports are disposed on the other side of the housing, with the second flow port configured for connection to a filter inlet port, and the fifth flow port configured for connection to a filter outlet port. Since the distance between the filter inlet and outlet ports varies from filter manufacturer to filter manufacturer, the inventive valve includes an offset coupling fitting enabling the valve to be connected to a variety of different filters. The offset coupling fitting includes first and second coupling ports lying along first and second coupling axes, respectively, with the first coupling axis offset from the second coupling axis by a distance h. Thus, assuming the second and fifth flow ports are spaced by a distance n, the offset coupling fitting permits the inventive valve to be readily configurable for connection to filtering systems utilizing filters having their filter inlet and outlet ports separated a distance ranging from (n−2h) to (n+2h).

The offset coupling fitting is preferably provided with an adjustment indicator marking on its outer surface. The second and fifth flow ports also preferably include indicating markings corresponding to pre-selected filter inlet/outlet distances. Preferably, these indicating markings will correspond with filter inlet/outlet port distances commonly utilized by filter manufacturers. By aligning the adjustment indicator marking on the offset coupling fitting with matched indicating markings on the second and fifth flow ports (an offset coupling fitting is provided for each of the second and fifth flow ports), the inventive valve may be readily configured for connection to various filters having different filter inlet/outlet port distances.

The present invention is also directed toward a method for reorienting an interconnected valve that includes disconnecting an adjoining member from a valve body, rotating the valve body with respect to the adjoining member, and reconnecting the valve body to the adjoining member.

It is an object of the present invention to provide a valve in which the valve bodies may be readily connected in multiple configurations.

It is a further object of the present invention to provide a valve in which multiple flow control members may be connected in multiple configurations to achieve desired flow control capabilities.

It is yet a further objection of the present invention to provide a modularly interconnectable valve in which valve bodies and diverting members may be independently reconfigured to efficiently and conveniently accommodate varying field conditions.

It is still a further object of the present invention to provide a interconnected valve that permits flow between valve bodies without the need for external connections It is another object of the present invention to provide a valve for backwashing applications readily movable between "filter" and "backwash" positions.

It is yet another object of the present invention to provide a valve for backwashing applications of minimal complexity in construction and cost.

It is still another object of the present invention to provide a low maintenance valve for backwashing applications.

It an additional object of the present invention to provide a valve for backwashing applications readily configurable for connection to filters having different distances separating their respective inlet and outlet ports.

Other aspects, objects and advantages of the present invention can be obtained from a study of the application, the drawings, and the appended claims.

The present invention offers the feature of permitting connection of valve bodies and flow control members in multiple configurations. Another feature of the present invention is to permit ready reconfiguration of the valve bodies and flow control members. The present invention also offers the feature of providing flow between interconnected valves without the necessity of an externally connected conduit pipeline. Accordingly, the present invention provides solutions to the shortcomings of conventional valve arrangements. Those of ordinary skill in the art will appreciate, however, that these and other details, features and advantages will become further apparent as the following detailed description proceeds.

BRIEF DESCRIPTION OF THE DRAWINGS

In the accompanying FIGS. 1–35, there are shown present preferred embodiments of the invention, wherein like reference numerals are employed to designate like parts, and wherein:

FIG. 16 is an exploded assembly view of the adapter of FIGS. 12–15 and diverters of the present invention as viewed from the bottom;

FIG. 17 is another exploded assembly view of the adapter and diverters of FIG. 16 as viewed from the top;

DETAILED DESCRIPTION OF THE INVENTION

Figure 1:
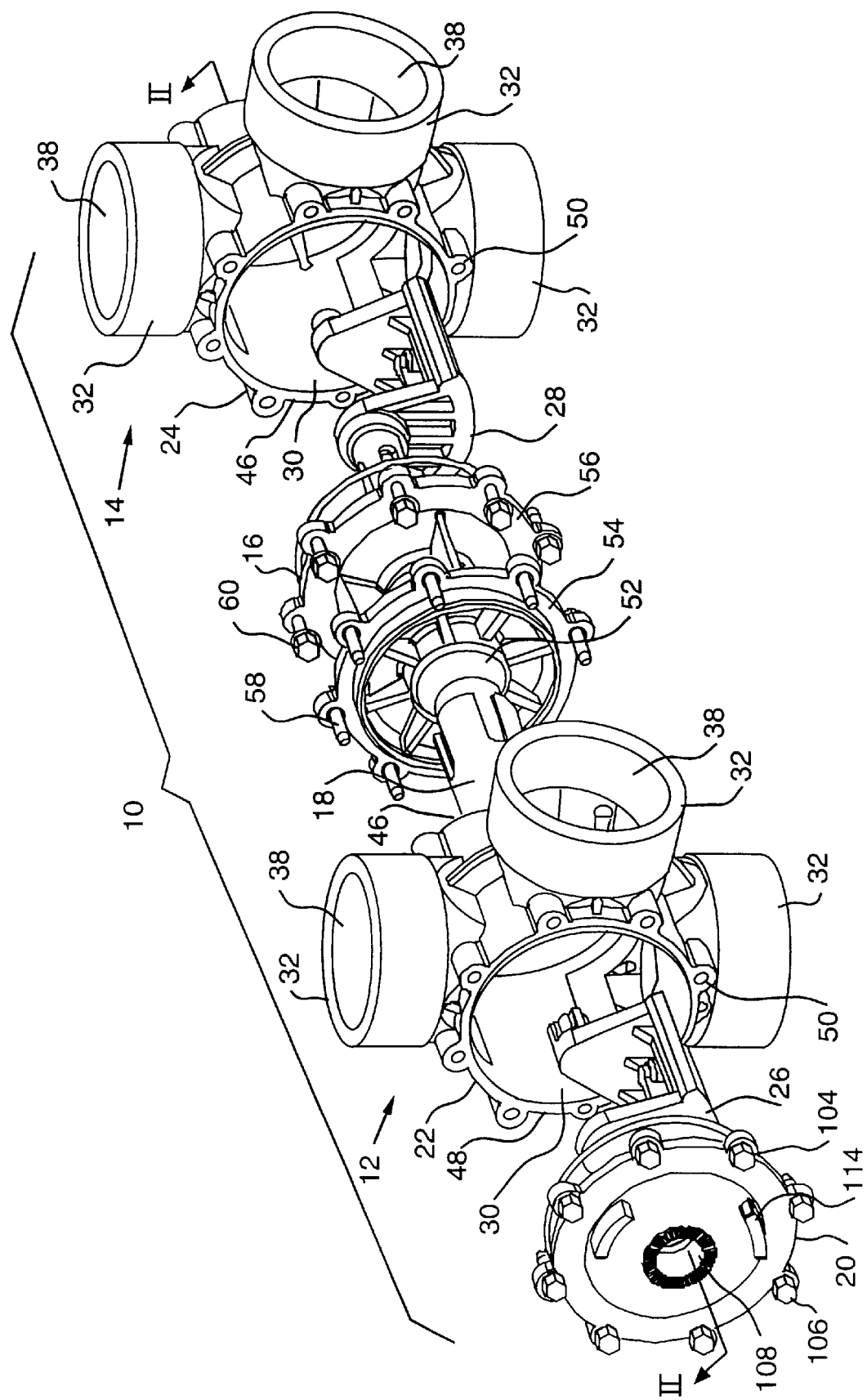
FIG. 1 is an exploded assembly view of a valve assembly of the present invention.
Figure 2:
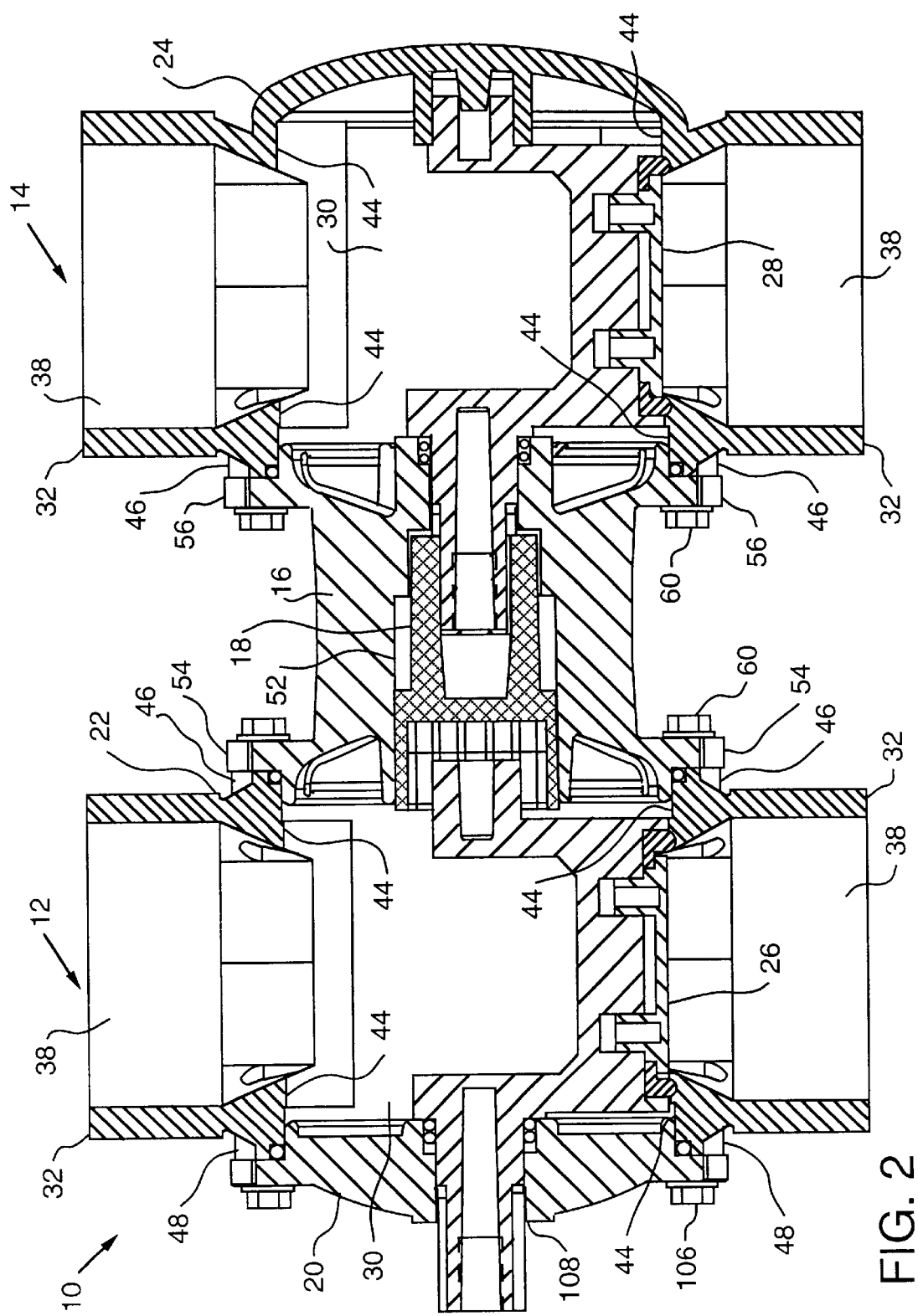
FIG. 2 is a cross-sectional elevational view of the assembled valve of FIG. 1, taken along line II—II in FIG. 1.

Referring now to the drawings for the purpose of illustrating present preferred embodiments of the invention only and not for the purpose of limiting the same, FIG. 1 shows an exploded perspective view of an interconnectable valve 10, and FIG. 2 illustrates an assembled cross-sectional view of the same interconnectable valve 10 constructed in accordance with the present invention. The interconnectable valve 10 includes two valve assemblies 12 and 14, an adjoining member 16, an adapter 18 and a cover 20. Each valve assembly 12,14 may include a valve body 22,24 and a diverter 26,28. Each of those portions of the assembly may be fabricated from many materials including plastic, steel, iron, stainless steel, brass, bronze, and the like. One of ordinary skill in the art will readily appreciate that the materials from which the valve components described herein are fabricated may be advantageously selected based on their compatibility with the types of fluids being handled by the valve 10 and the environment in which the valve 10 will be used, including, for example, the pressure and temperature conditions to which the valve 10 will be exposed. Furthermore, while the embodiment illustrated in FIG. 1 includes two valve assemblies 12 and 14 interconnected as a single unit, the invention may include additional valve assemblies as necessary to meet the requirements of particular pipeline applications. Thus, the present invention is not limited to a dual-stacked valve arrangement.

Figure 3:
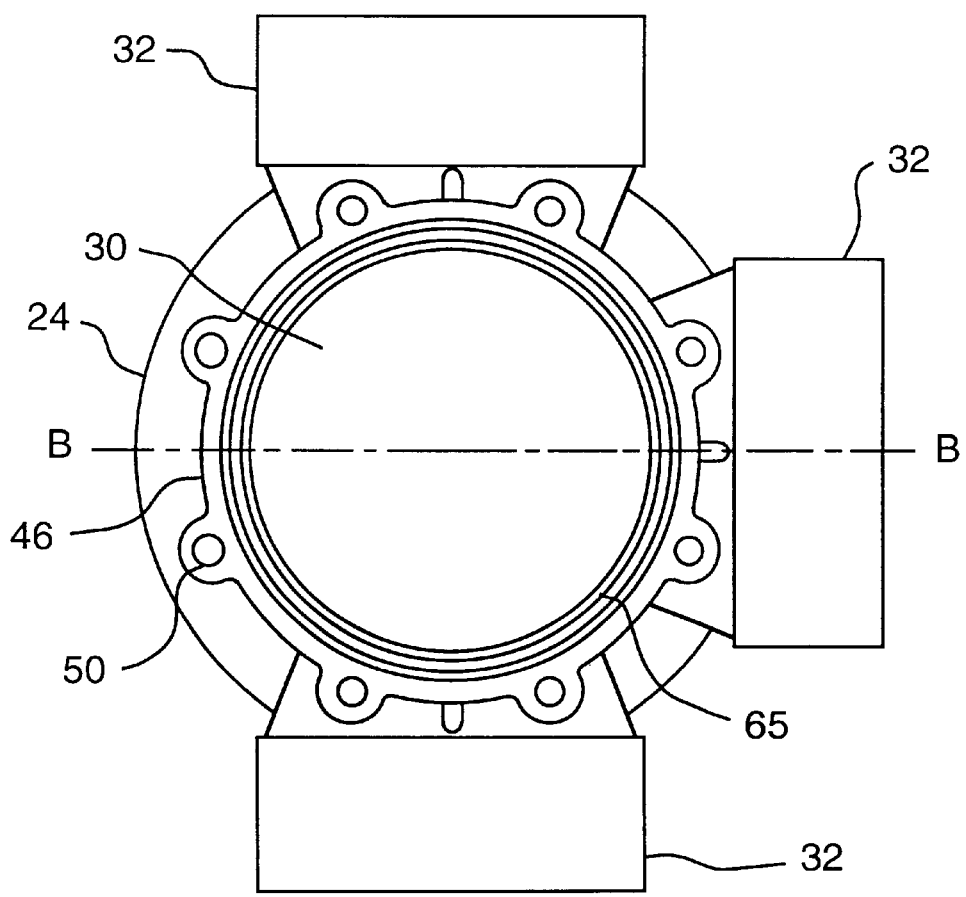
FIG. 3 is a top view of one of the valve bodies employed in the valve assembly of FIG. 1.
Figure 4:
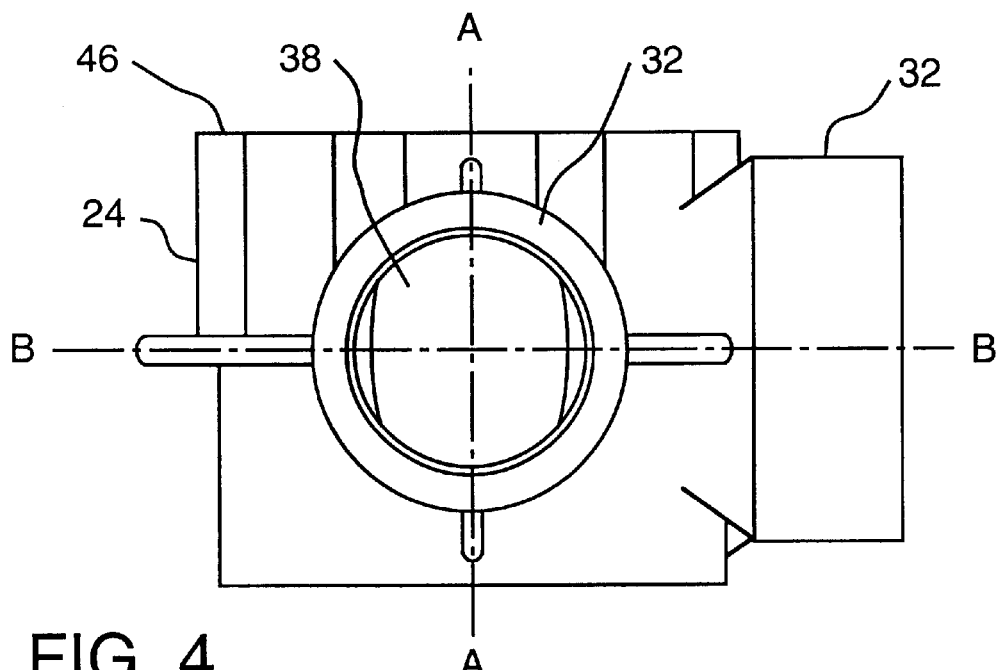
FIG. 4 is an elevational view of the valve body of FIG. 3.

FIGS. 3 and 4 illustrate a valve body 24 for directing fluid flowing through a pipeline system. The valve body 24 defines an annular chamber 30 and includes at least one coupling member 32 that defines at least one port 38 in the valve body 24. The embodiment illustrated in FIGS. 3 and 4 includes three coupling members 32 defining three ports 38. Each coupling member 32 may include a seat 44 (see FIG. 2) for engagement with the diverter 28 to prevent fluid flow through the associated port 38. The seat 44 may include a surface formed to engage the diverter 28 and serves to establish a fluid-tight seal between the valve body 24 and the diverter 28 when the diverter 28 engages the seat 44. The coupling members 32 are adapted to facilitate attachment of the valve body 24 to fluid-carrying conduits, i.e, sections of pipeline, etc. The coupling members 32 include slip fit couplers, and the conduits (not shown) may be retained in their respective coupling members 32 by an appropriate attachment medium, such as an adhesive manufactured by IPS Corporation of Gardena, Calif. 90248. The conduits may alternatively be attached to the coupling members 32 by welding, by threaded or compression connections, and other conventional connection methods.

As shown in FIGS. 3 and 4, the valve body 24 also includes a flange 46, having an axis A—A generally perpendicular to the axis B—B of the ports 38, for connection to another valve component such as an adjoining member 16 or cover 20. The valve body may include second flange 48 opposite the first flange 46 for connection to another valve component, as is illustrated by the valve body 22 in FIGS. 1 and 2. Alternately, the valve body may be closed opposite the first flange 46, as is illustrated by the valve body 24 in FIGS. 1 and 2. The flanges 46 and 48 may include a plurality of threaded holes 50 to facilitates connection to another valve component. Valve bodies 22 and 24, having various numbers of ports 38 and various port configurations, may have similar flanges 46 and 48 so that many configurations of valve bodies 22 and 24 may be connected together.

Figure 5:
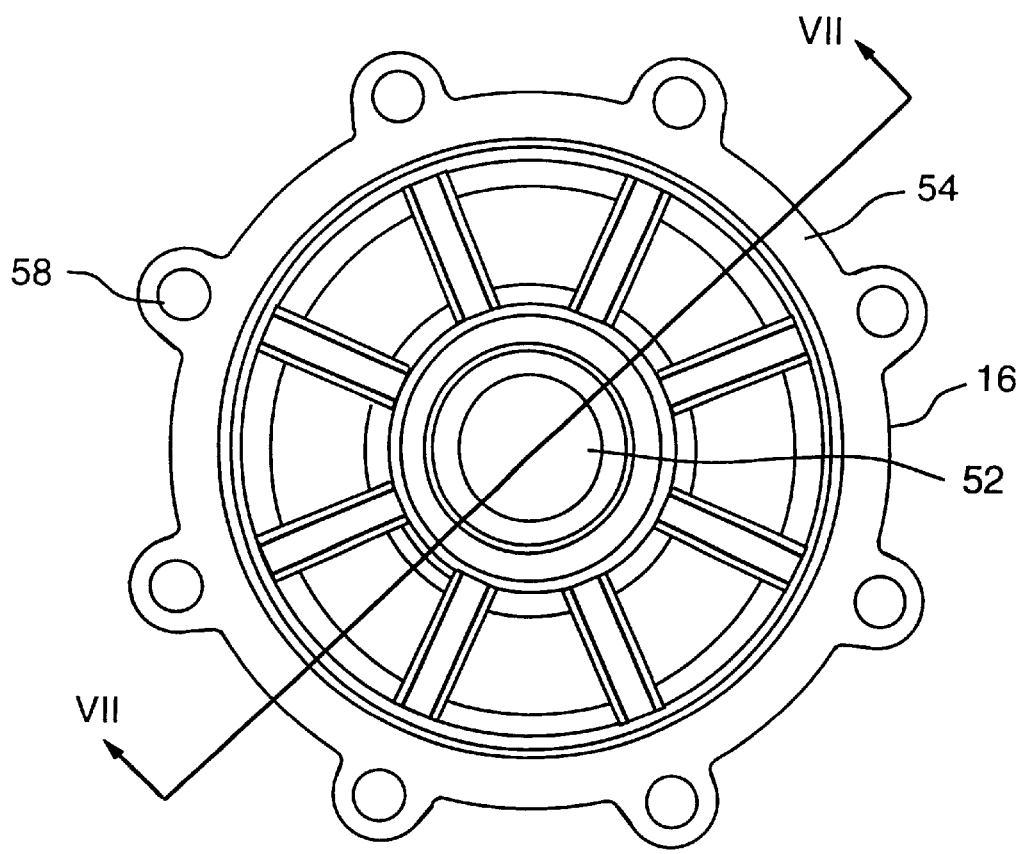
FIG. 5 is a top view of an adjoining member of the present invention.
Figure 6:
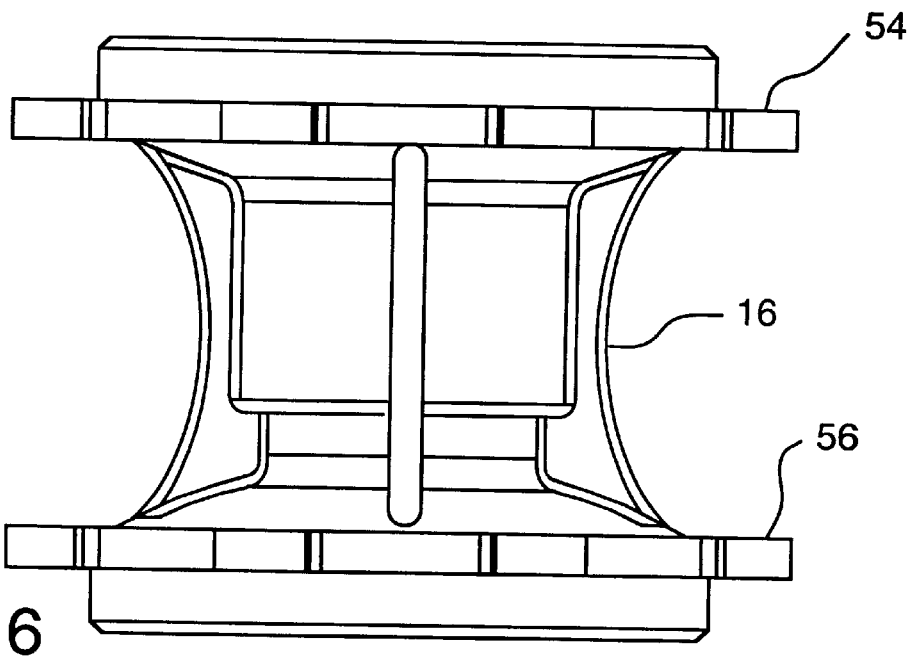
FIG. 6 is an elevational view of the adjoining member of FIG. 5.
Figure 7:
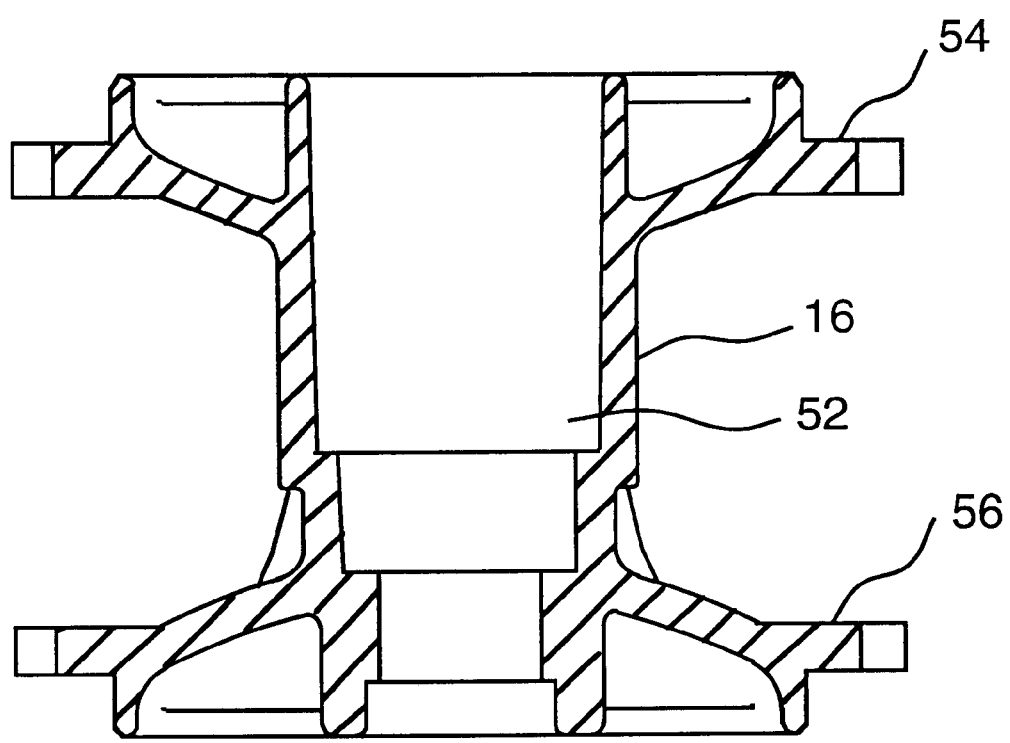
FIG. 7 is a cross-sectional view of the adjoining member of FIG. 5, taken along line VII—VII in FIG. 5.
Figure 8:
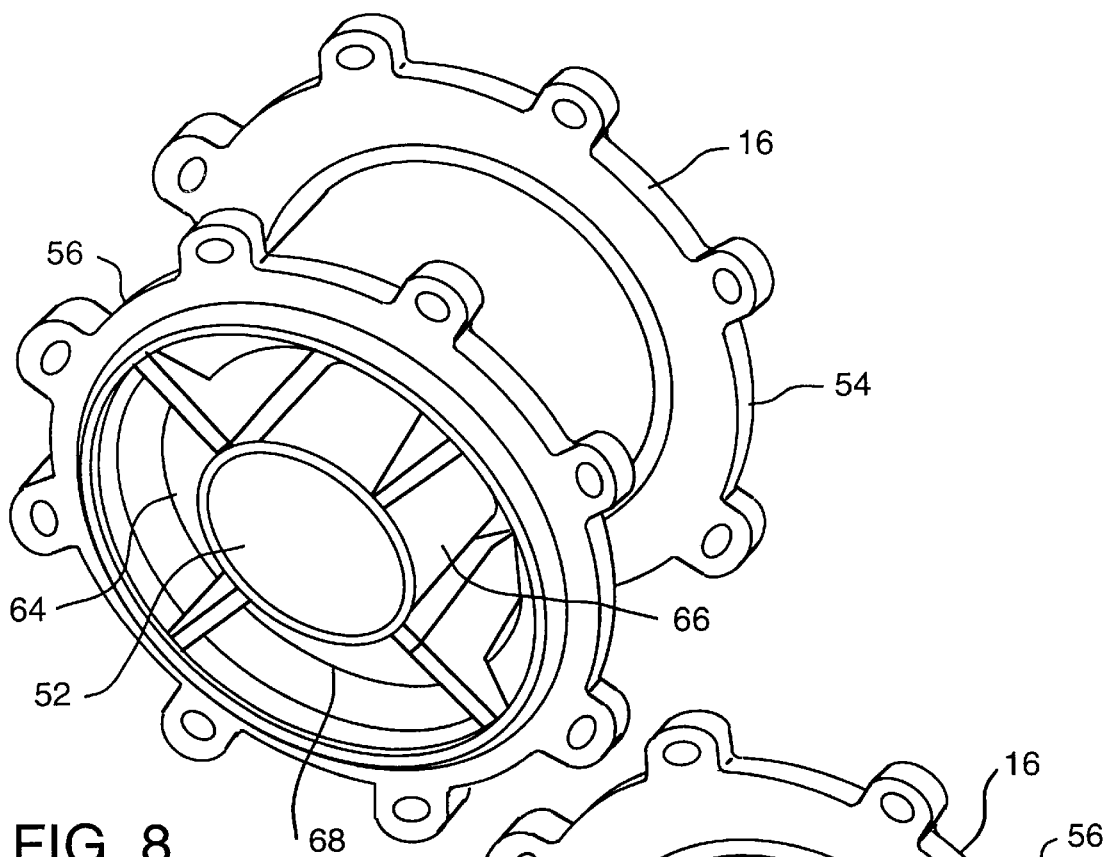
FIG. 8 is an end perspective view of another embodiment of the adjoining member of the present invention.
Figure 9:
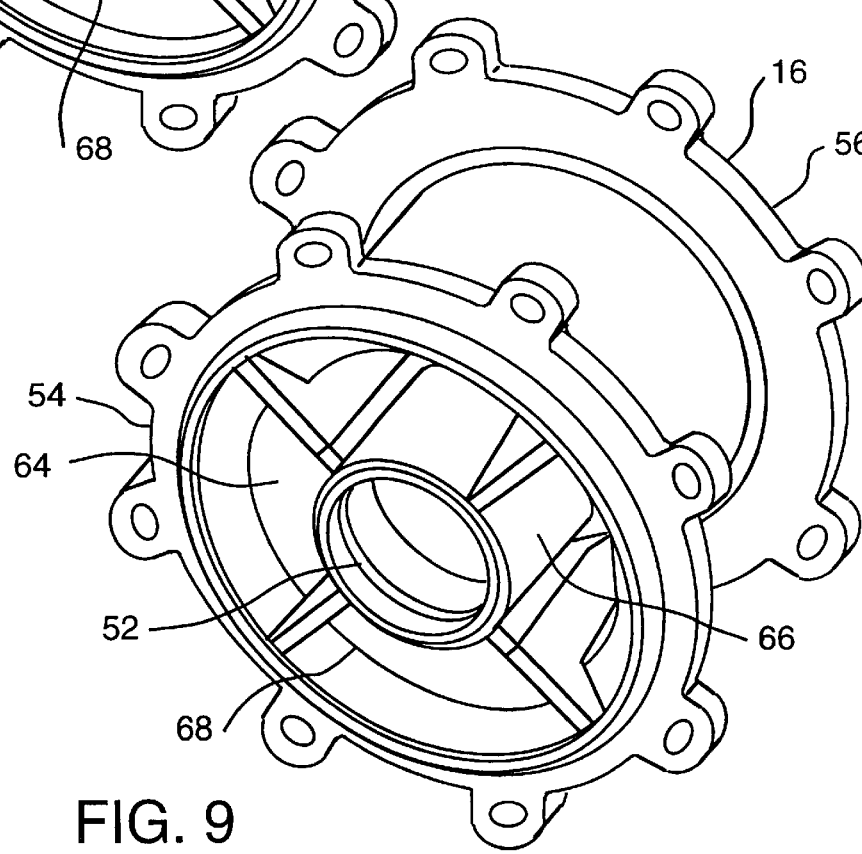
FIG. 9 is a perspective view of the opposite end of the adjoining member of FIG. 8.
Figure 10:
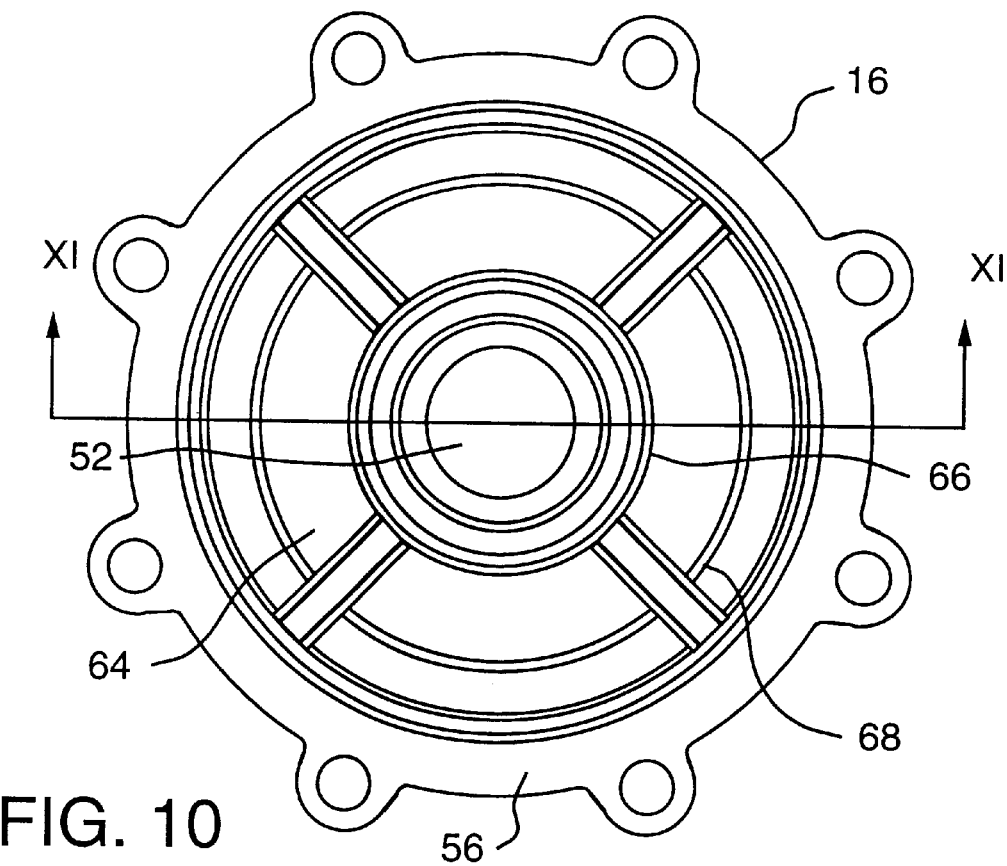
FIG. 10 is a top view of the adjoining member of FIG. 8.
Figure 11:
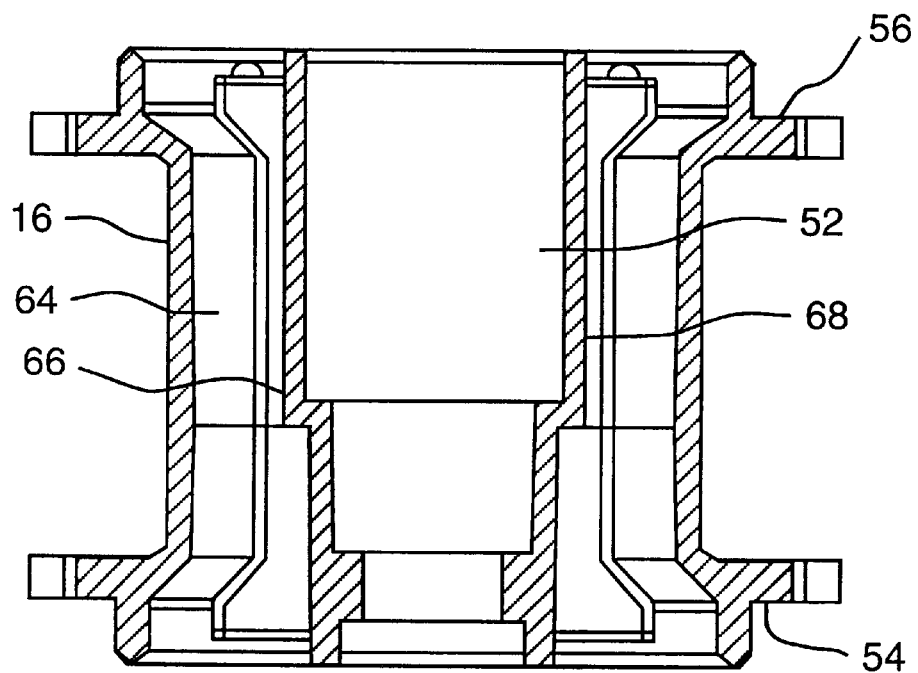
FIG. 11 is a cross-sectional, elevational view of the adjoining member of FIG. 10, taken along line XI—XI in FIG. 10.
Figure 12:
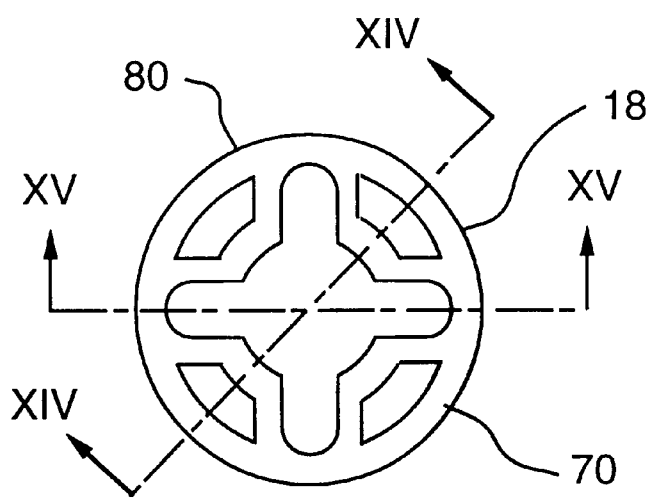
FIG. 12 is a top view of an adapter of the present invention.
Figure 13:
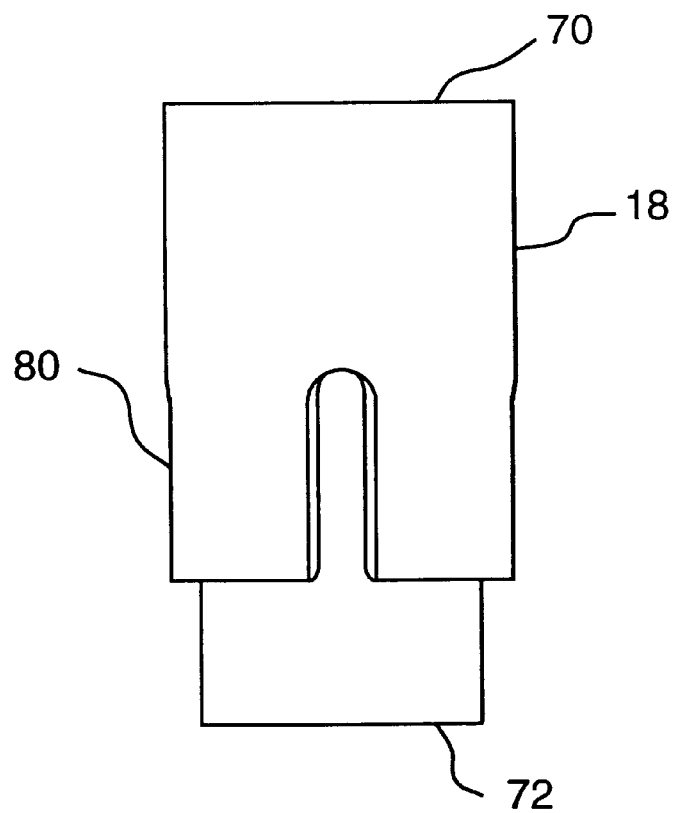
FIG. 13 is an elevational view of the adapter of FIG. 12.
Figure 14:
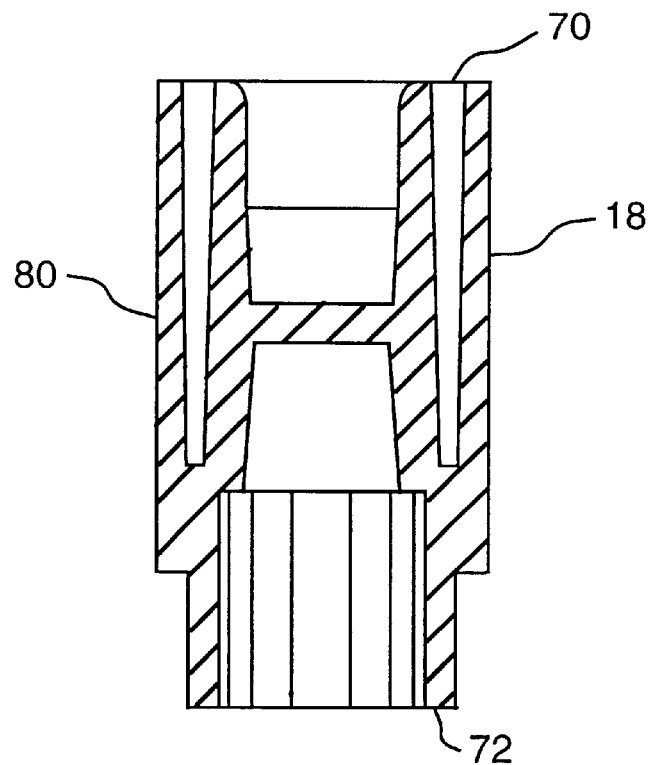
FIG. 14 is a cross-sectional view of the adapter of FIG. 12, taken along line XIV—XIV in FIG. 12.
Figure 15:
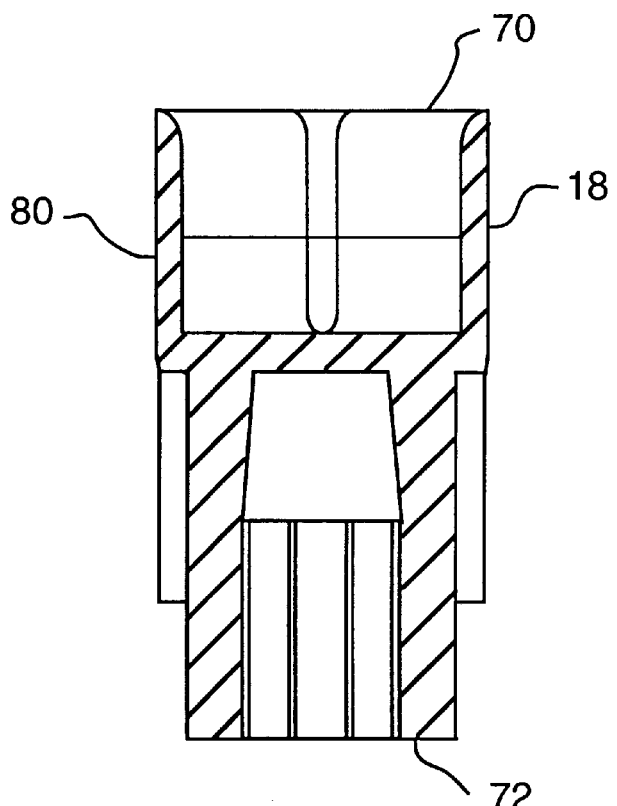
FIG. 15 is a cross-sectional view of the adapter of FIG. 12, taken along line XV—XV in FIG. 12.

FIGS. 5–7 illustrate an adjoining member 16 which may be used to connect two valve assemblies 12 and 14 together to form an interconnected valve 10, as illustrated in FIGS. 1 and 2. The adjoining member 16 defines an annular channel 52 and two opposing flanges 54 and 56, that are adapted to interchangeably engage the flanges 46 and 48 on either of the valve bodies 22 and 24. The adjoining member flanges 54 and 56 may also include a plurality of holes 58 through which bolts 60 may pass for removable connection to the valve bodies 22 and 24. The holes 58 may be arranged in a symmetrical pattern around the circumference of the adjoining member 16 to enable the adjoining member 16 to be connected to the valve bodies 22 and 24 in a variety of positions. Such connection is accomplished by aligning the holes 58 with threaded holes 50 in the valve bodies 22 and 24 and utilizing bolts 60 or other fasteners to complete the connection. One of ordinary skill in the art will appreciate that such an attachment arrangement also facilitates quick assembly and disassembly of valve components. Other means of fastening that permit ease of disconnecting and reconnecting, preferably with standard hand tools, may be utilized in place of the flange 46 and bolts 60 described herein without departing from the spirit and scope of the present invention.

With the bolts 60 removed, the adjoining member 16 can be rotated relative to each valve body 22 and 24 until the valve bodies 22 and 24 are oriented in the desired position. The holes 58 of each adjoining member flange 54 and 56 align with the threaded holes 50 of the valve bodies 22 and 24 to facilitate reattachment of the adjoining member 16 to the valve bodies 22 and 24. If finer adjustment is required, slots may be utilized in place of the holes 58 in the flanges 54 and 56. The position of each valve body 22 and 24 in an interconnected valve 10 may be thereby adjusted with respect to every other valve body 22 and 24 in that valve unit. Additional valve assemblies 12 and 14 may be combined into the valve unit by connecting additional adjoining members 16 and valve bodies in series. In one embodiment, a gasket (not shown) is positioned between the adjoining member 16 and each of the valve bodies 22 and 24 to achieve a fluid-tight seal.

FIGS. 8–11 illustrate an alternative embodiment of the adjoining member 16. A flow passage is provided in the adjoining member 16 to permit flow between the valve bodies 22 and 24. As may be seen in FIG. 3, the valve body 22 may have an opening 65 to the annular chamber 30 at the flange 46,48 to which the adjoining member 16 is attached. Therefore, when an adjoining member 16 having a flow passage 64 is attached to the two valve bodies 22 and 24, fluid may flow from the annular chamber 30 of the first valve body 22 through the flow passage 64 in the adjoining member 16 to the annular chamber 30 of the second valve body 24. The flow passage 64 may be provided in various orientations through the adjoining member 16. In the embodiment illustrated in FIGS. 8–11, the flow passage 64 is defined by an inner wall 66 surrounding the annular channel 52 and an outer wall 68 of the adjoining member 16. One of ordinary skill in the art will appreciate that by utilizing the flow passage 64, fluid flowing through the inlet port 38 of the first valve body 22 can pass to the annular chamber 30 of the second valve body 24 without the need for additional port connections on valve bodies 22 and 24.

FIGS. 12–15 illustrate an adapter 18 for coupling the diverters 26 and 28 of the valve 10 illustrated in FIG. 1. The adapter 18 may be rotatably disposed in the annular channel 52 of the adjoining member 16. The adapter 18 may be keyed at a first end 70 that extends toward the first valve body 22 when placed in the annular channel 52 of the adjoining member 16, and may also be keyed at a second end 72 that extends toward the second valve body 24 when placed in the annular channel 52 of the adjoining member 16. The keyed ends 70 and 72 of the adapter 16 are configured to slidably engage a portion of the first diverter 26 and the second diverter 28.

Figure 18:
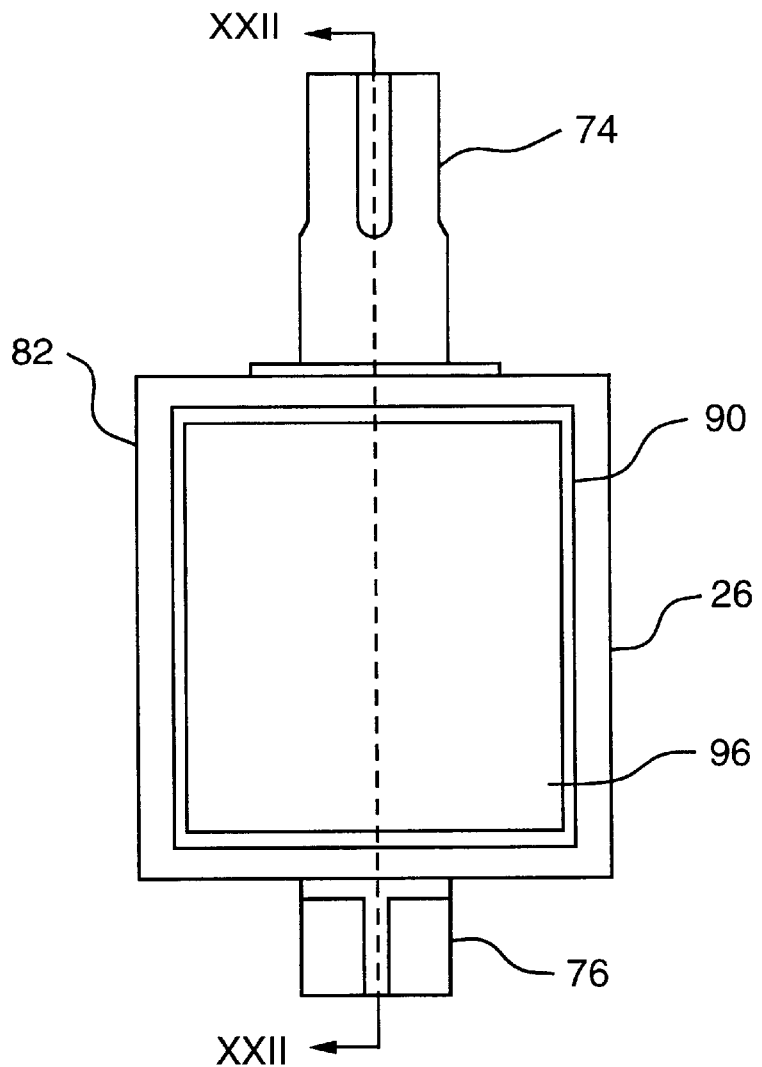
FIG. 18 is a front elevational view of a diverter of the present invention.
Figure 19:
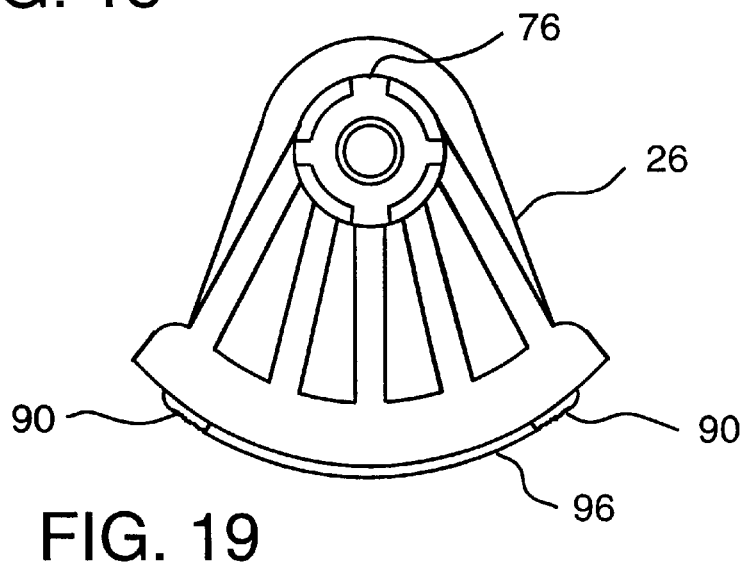
FIG. 19 is a bottom view of the diverter of FIG. 18.

FIGS. 16–22 illustrate the first and second diverters 26 and 28 which are utilized to selectively prevent or divert fluid flow through portions of the valve bodies 22 and 24. FIGS. 16 and 17 are exploded perspective views of the first and second diverters 26 and 28 and the adapter 22. FIGS. 18 and 19 depict an embodiment of the first diverter 26. The diverters 26 and 28 each have a primary stem 74 and an auxiliary stem 76 (first diverter 26) and 78 (second diverter 28).

The primary stems 74 of the first diverter 26 and the second diverter 28 are keyed for non-rotatable complimentary engagement with the adapter 18 in a plurality of orientations about an actuator axis C—C. The key arrangement of the primary stem 74 may also complimentarily engage an actuator for rotating the diverters 26,28 of the interconnected valve 10.

Figure 20:
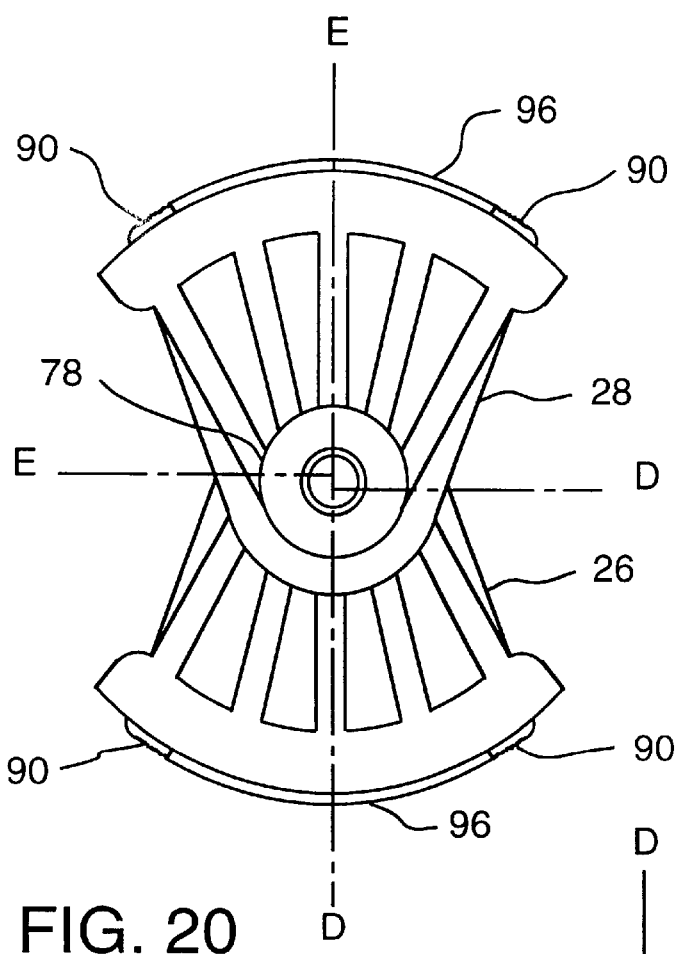
FIG. 20 is a bottom view of the first and second diverters of the present invention oriented at 180° with respect to each other.
Figure 21:
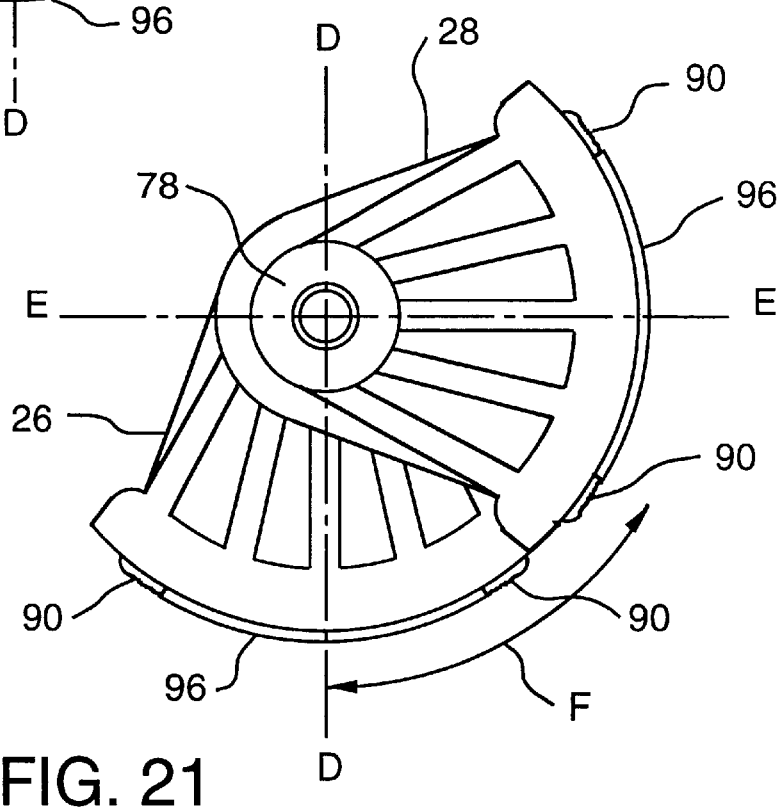
FIG. 21 is a bottom view of the first and second diverters of FIG. 20 oriented at 90° with respect to each other.

The auxiliary stem 76 of the first diverter 26 is intended to non-rotatably engage the adapter 18, and is so keyed for complimentary engagement with the adapter 18 in a plurality of orientations about the actuator axis C—C. The auxiliary stem 78 of the second diverter 28 is intended to rotatably engage the second valve body 24 and, therefore, is configured for complimentary engagement with the second valve body 24. Each keyed stem 74 and 76 may be arranged in a symmetrical pattern such that the diverters 26 and 28 may be disengaged from, rotated with respect to, and slidably re-engaged with, the adapter 18 in a plurality of axial orientations. By repositioning the stems 74 and 76 relative to the adapter 18, the diverters 26 and 28 may be placed in a plurality of configurations with respect to each other. FIG. 20 illustrates the first diverter 26, having diverter axis D—D, and the second diverter 28, having diverter axis E—E, oriented at approximately a 180° angle with respect to each other. FIG. 21 illustrates an alternative orientation, wherein the first diverter 26, having diverter axis D—D, and the second diverter 28, having diverter axis E—E, are oriented at approximately a 90° angle with respect to each other. The purpose of this unique capability will be discussed in further detail below.

The adapter ends 70 and 72 (see FIGS. 14 and 15) may have the same key configuration, and the primary and auxiliary stems 74 and 76 may have the same key configuration, to facilitate interconnection in a plurality of configurations. Alternately, the first and second ends 70 and 72 of the adapter 18 may be keyed differently. For example, the first end 70 of the adapter 18 may be keyed such that it will engage the auxiliary stem 76 of the first diverter 26, and the second end 72 of the adapter 18 may be keyed such that it will engage the primary stem 74 of the first and second diverters 26 and 28. The outer surface 80 of the adapter 18 may also be shaped that such it will engage the annular channel 52 of the adjoining member 16 in a single alignment. This alternate embodiment helps ensure that those components are oriented in a predetermined configuration when assembled.

In place of, or in addition to, the keyed arrangement discussed above, the adapter 18 may be fastened to the keyed diverter stems 74 and 76 by way of locking mechanisms, such as, for example, set screws (not shown), to prevent movement of the stems 74 and 76 with respect to the adapter 18. Where no locking mechanism is utilized, movement of the diverter 26 or 28 may be limited by utilizing a diverter 26 or 28 that is sized such that its movement in the direction of the actuator axis C—C is minimized when the diverter 26 or 28 is operably disposed in the annular chamber 30 of the valve body 22.

When assembled, the diverters 26 and 28 are placed in the valve bodies 22 and 24. Each diverter 26,28 has a diverter axis D—D, E—E along which the diverter 26,28 extends to engage its associated valve body 22,24. Each diverter 26,28 may be rotated to selectively and sealingly engage the corresponding seats 44 of the coupling member 32 to prevent fluid flow through the associated port 38. The diverters 26,28 may be rotated so as to partially block a corresponding port 38 in their respective valve bodies 22,24, thereby reducing the flow of fluid passing through that port 38 In the alternative, the diverters 26,28 may be rotated within their respective valve bodies 22,24 to permit unimpeded fluid flow therethrough. The diverters 26,28 may also be used to block, or partially block, fluid flow through more than one port 38 in their respective valve bodies 22,24 at a time. Each valve body 22,24 or diverter 26,28 may also be provided with a stop (not shown) to prevent the diverter 26,28 from being rotated about the actuation axis C—C beyond a desired position.

Figure 22:
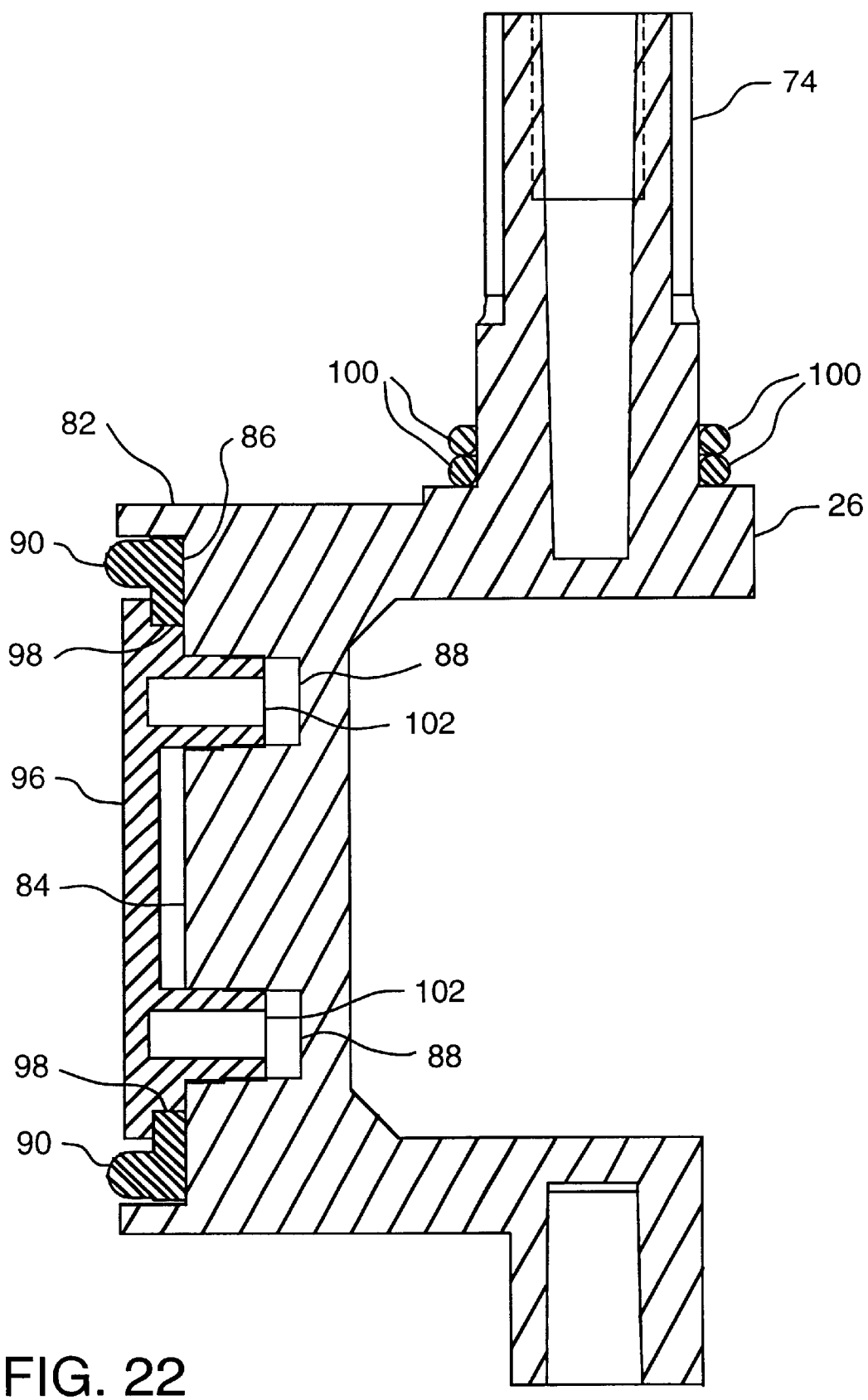
FIG. 22 is a cross-sectional view of the diverter of FIG. 18, taken along line XXII—XXII in FIG. 18.
Figure 23:
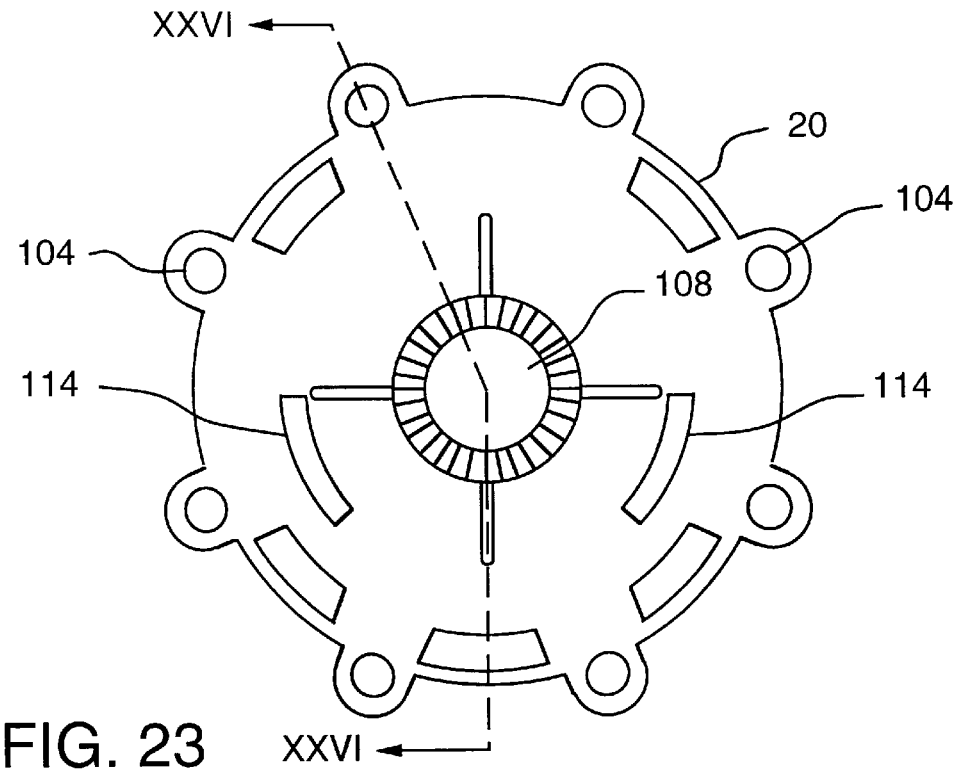
FIG. 23 is a top view of a cover of the present invention.
Figure 24:
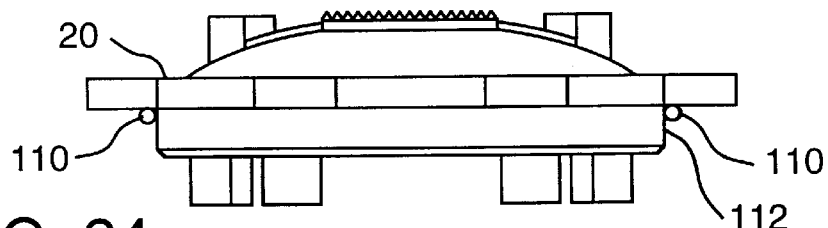
FIG. 24 is an elevational view of the cover of FIG. 23.
Figure 25:
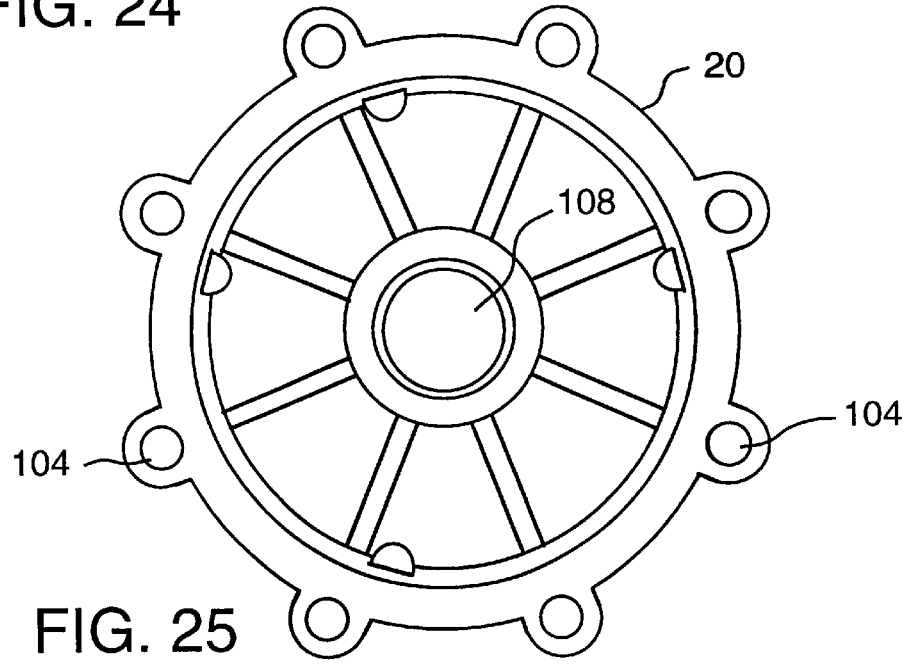
FIG. 25 is a bottom view of the cover of FIGS. 23 and 24.
Figure 26:
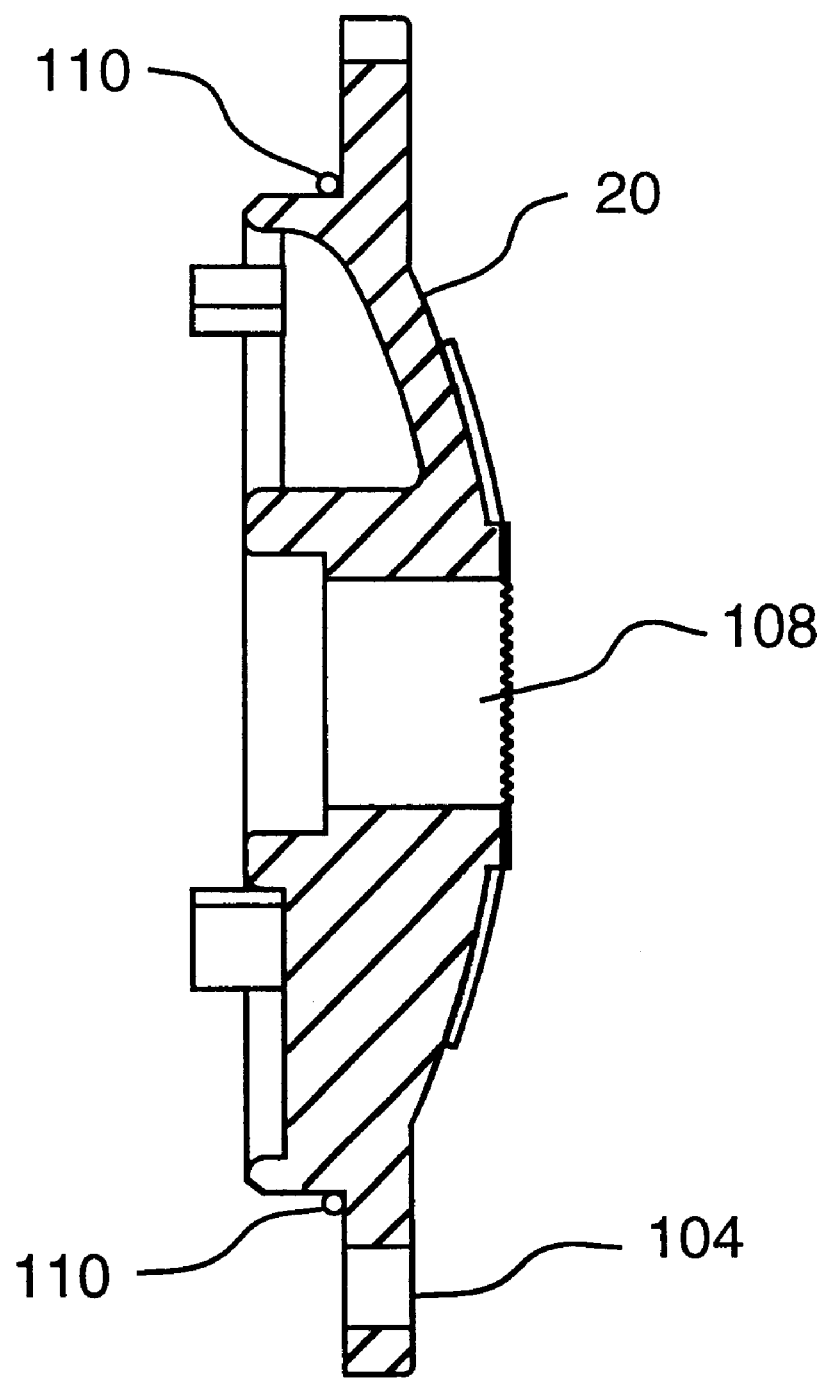
FIG. 26 is a cross-sectional view of the cover of FIGS. 23–25, taken along line XXVI—XXVI in FIG. 23.

Also, as shown in FIG. 22, the diverters 26 and 28 may each include a seal 90 and a retainer plate 96 for improved engagement with the seat 44 of the coupling member 32,34. The diverter 26,28 also includes an upstanding rim 82 that extends around the perimeter of a face 84 to define a seal-receiving recess 86 therein. Two pin-receiving cavities 88 are also preferably provided in the face 84 of the diverter 26,28. The seal 90 may be fabricated from a material that is compatible with the type of fluid flowing through the valve, such as, for example, silicone with a Teflon® laminate, and is attached to the diverter 26,28 by seal retainer plate 96. To facilitate such attachment, an opening 98 is provided through the seal 90. Two bosses or pins 102 protrude from the underside of the seal retainer plate 96 and are received in the corresponding cavities 88 in the diverter 26,28. Thus, as shown in FIG. 22, the seal 90 is placed in the seal-receiving cavity 88 in the diverter 26,28 and is retained therein by inserting the pins 102 of the seal retainer plate 96 into the pin-receiving cavities 88 formed in the face 84 of the diverter 26,28. The diverter 26,28 and seal retainer plate 96 may be fabricated from thirty percent (30%) glass-filled Noryl, and the pins 102 may be retained within the cavities 88 by ultrasonic welding. One of ordinary skill in the art will appreciate, however, that the seal 90 could be formed from various other suitable materials and may be attached to the diverter 26,28 by various other suitable means.

One or more O-ring seals 100 are disposed on the primary or auxiliary stems 74,76,78 to prevent leakage between the stems 74,76,78 and the corresponding valve bodies 22,24 or cover 20. One skilled in the art will recognize that a ball, disc, or other types of flow control members may be successfully utilized in the present invention in place of the diverters 26 and 28 discussed hereinabove without departing from the spirit and scope of the present invention.

FIGS. 23–26 illustrate the cover 20 for fluid tight connection to a valve body flange 46 and/or for actuator connection purposes. The cover 20 includes holes 104 arranged to correspond to the threaded holes 50 of the valve body 22,24. Bolts 106 (see FIGS. 1 and 2) extend through the cover holes 104 and are received in the threaded holes 50 of the valve body 22,24. A diverter stem hole 108 is provided through which the primary diverter stem 74 extends for connection to an actuator (not shown). A sealing ring 110 is received within a groove 112 in the valve body 22,24 to achieve a fluid-tight seal between the valve body 22,24 and the cover 20. Actuator mounting tabs 114 are also provided so that a compatible actuator may be rigidly mounted on the cover 20.

One skilled in the art will recognize that may variations of manual or automatic actuation may be utilized with the present invention. The skilled artisan will also recognize that other types of mounting means may be provided on the cover 20 to accommodate the desired form of valve actuation.

Common actuation of the diverters 26 and 28 may be accomplished by way of a single actuator attached to the primary stem 74 of the diverter 26 that extends through the cover 20. As previously discussed, the diverters 26 and 28 may be positioned in the adapter 18 in a variety of configurations in order to accommodate the flow requirements of the particular piping system. Once the diverters 26 and 28 and the adapter 18 have been interconnected, however, all of the diverters 26 and 28 will turn together. For example, in the dual valve arrangement illustrated herein, the first diverter 26 may be interconnected relative to the second diverter 28 such that when the actuator (not shown) is rotated, the first diverter 26 prevents fluid flow through the ports 38 in its corresponding valve body 22, while the second diverter 28 permits fluid to flow through the ports 38 of its corresponding valve body 24, and vice versa. As previously noted, the present invention is not limited to the dual valve arrangement shown and described, but three, four, five, or more valve bodies, and thus diverters, may be interconnected for simultaneous actuation without departing from the spirit and scope of the present invention.

Common actuation of the interconnected diverters 26 and 28 may thereby proven system "dead heading" which may occur on separately actuated systems when there is either a failure of one of the actuators, or when the actuators are not simultaneously actuated. "Dead heading" is a term commonly used in the fluid control industry that means to prevent any flow in the system. The skilled artisan will appreciate that the unique and novel construction of the present invention enables a myriad of flow control arrangements to be obtained for a myriad of different piping conditions and applications.

Utilizing a single actuator to simultaneously actuate multiple diverts 26 and 28, and/or other flow control members, can also provide cost and space savings. In particular, it will be appreciated that the cost of a single actuator capable of operating multiple diverters 26 and 28 is typically less than the cost of multiple actuators to be applied to each diverter 26 and 28 separately, and the labor cost associated with installing and adjusting a single actuator can be less than the cost associated with installing and adjusting multiple actuators.

Additional benefits may also be realized by the efficient preconfiguration of multiple valve bodies 22 and 24 into a single unit prior to delivery to the installation site. The subject interconnected valve 10 of the present invention may be preconfigured in various configurations utilizing common components, thereby reducing installation and layout time at the installation site. In addition to the varied preconfiguration permitted by the subject valve 10, the subject valve 10 also offers ease of reconfiguration in the field.

The additional feature of permitting fluid to flow through the adjoining member 16 of the subject valve 10 provides further improved efficiency, both when preconfiguring and when reconfiguring the valve 10.

Figure 27:
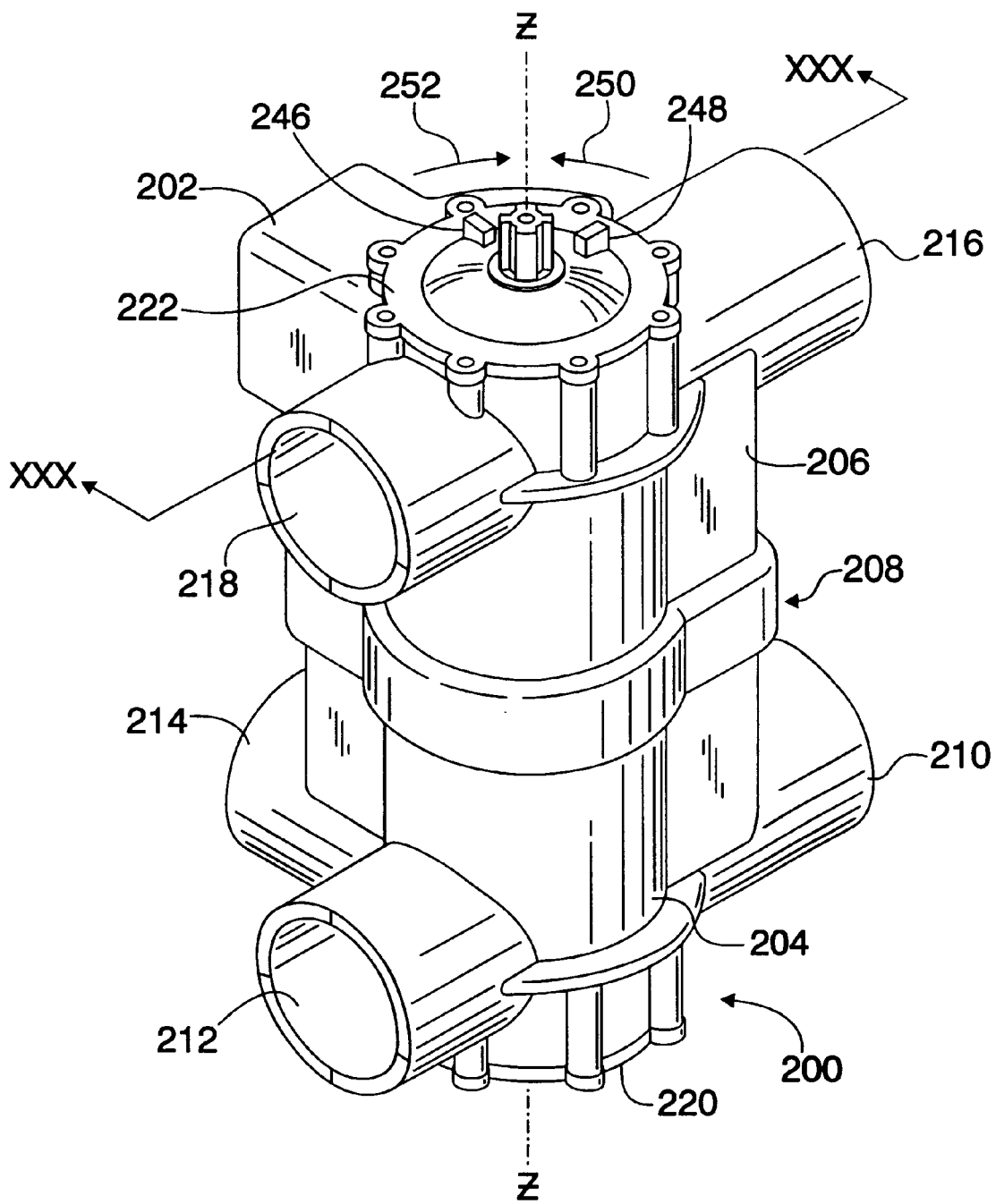
FIG. 27 is a perspective view of a backwash valve according to a further embodiment of the present invention.

FIG. 27 illustrates a backwash valve, shown generally at 200, according to a further embodiment of the present invention. The valve 200 includes a housing 202 having first 204 and second 206 housing elements connected together at a connection area 208 by welding, soldering, gluing, or other conventional connection methods. The first housing element 204 defines first 210, second 212 and third 214 flow ports configured for connection to piping or other conduits, as previously described. The second housing element 206 defines fourth 216 and fifth 218 flow ports also configured for attachment to piping or other conduits, as previously described. Covers 220 and 222 are connected to the first 204 and the second 206 housing elements, respectively, for sealing the valve 200 from leakage. The covers 220 and 222 are connected to the first 204 and second 206 housing elements via bolts (not shown) extending through holes formed in the covers 220 and 222 in the same manner as previously described with respect to the cover 20 As will be described herein, the valve 200 is operable between first and second positions to selectively divert fluid between the first through fifth flow ports. In the first position, the first 210 and second 212 flow ports are in fluid communication, and the fourth 216 and fifth 218 flow ports are in fluid communication. In the second position, the first 210 and fifth 218 flow ports are in fluid communication, and the second 212 and third 214 flow ports are in fluid communication.

Referring to FIGS. 28–31, the internal configuration and operation of the valve 200 will now be described. The first housing element 204 defines a first flow area 224, with the first 210, second 212 and third 214 flow ports opening into the first flow area 224. The second housing element 206 defines a second flow area 226, with the fourth 216 and fifth 218 flow ports opening into the second flow area 226 The first 204 and second 206 housing elements further define a flow passage, or manifold, 228 fluidly connecting the first flow port 210 with the second flow area 226. The flow passage 228 has one end opening into the first flow port 210 adjacent the first flow area 224, and another end opening into the second flow area 226. Each of the first 204 and second 206 housing elements defines a portion of the flow passage 228.

Figure 28:
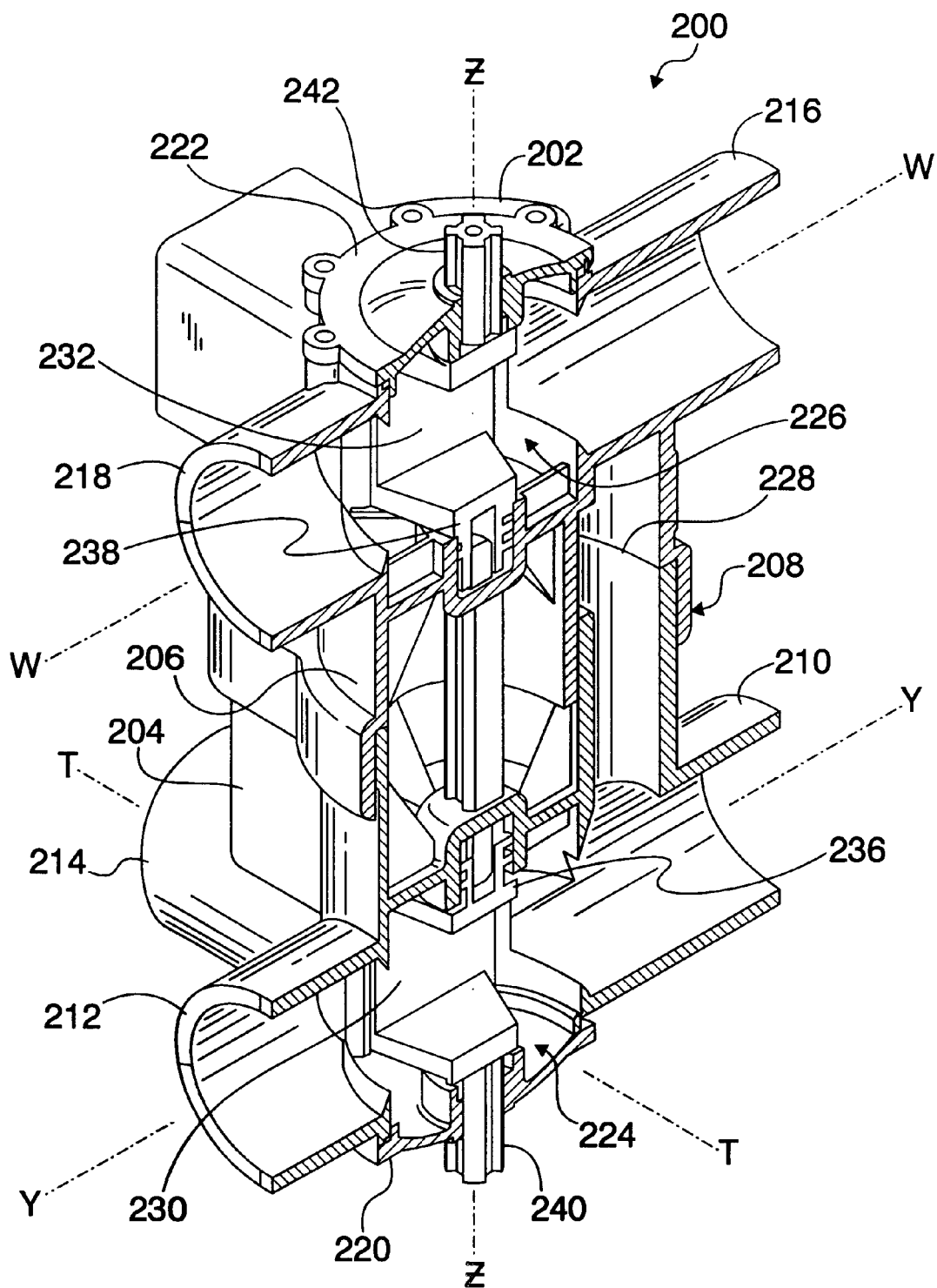
FIG. 28 is a cross-sectional perspective view of the backwash valve of FIG. 27, taken along line XXX—XXX in FIG. 27, with the valve gates in a first position.
Figure 29:
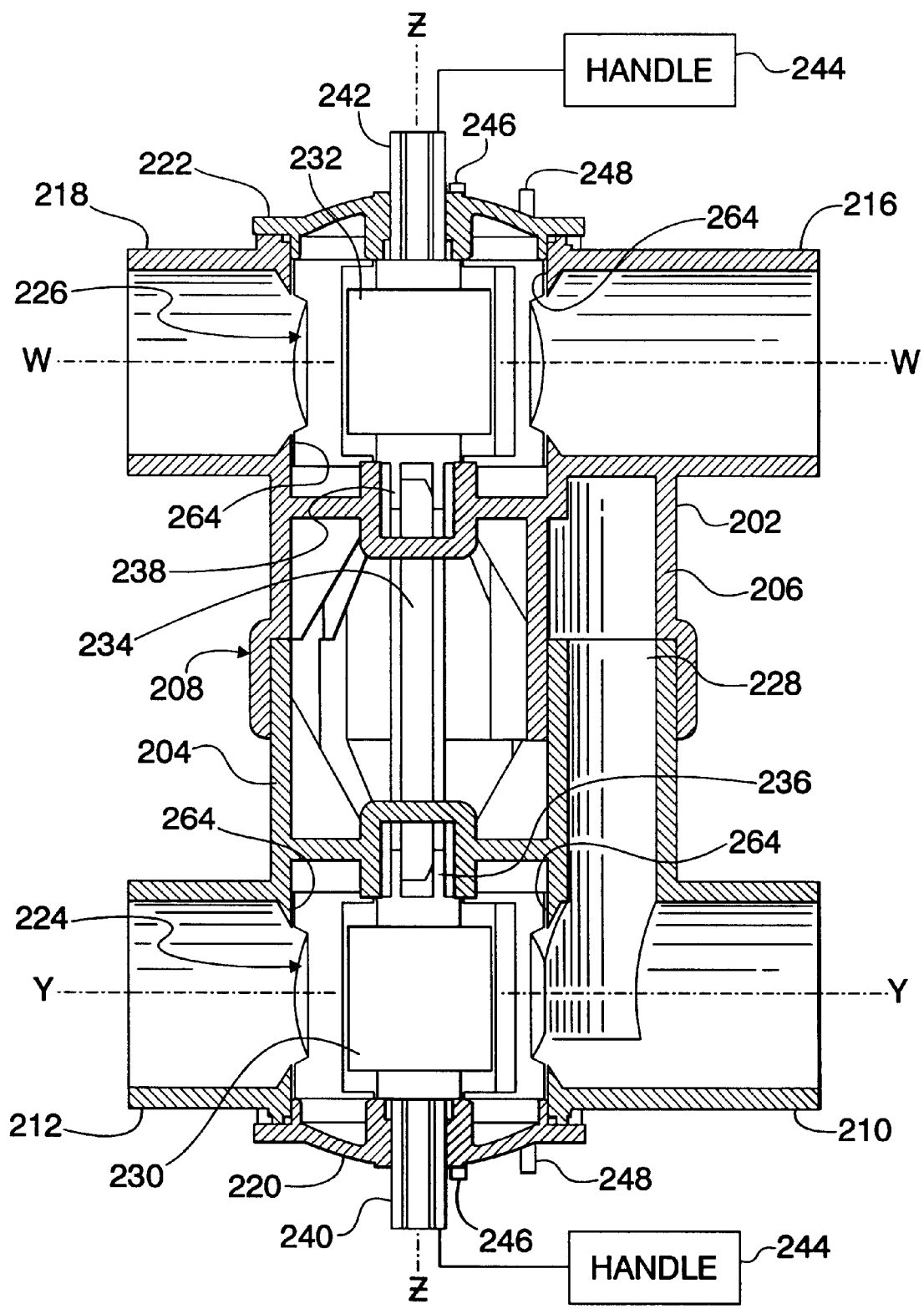
FIG. 29 is a cross-sectional view of the backwash valve of FIG. 27, taken along line XXX—XXX in FIG. 27, with the valve gates in the first position.
Figure 30:
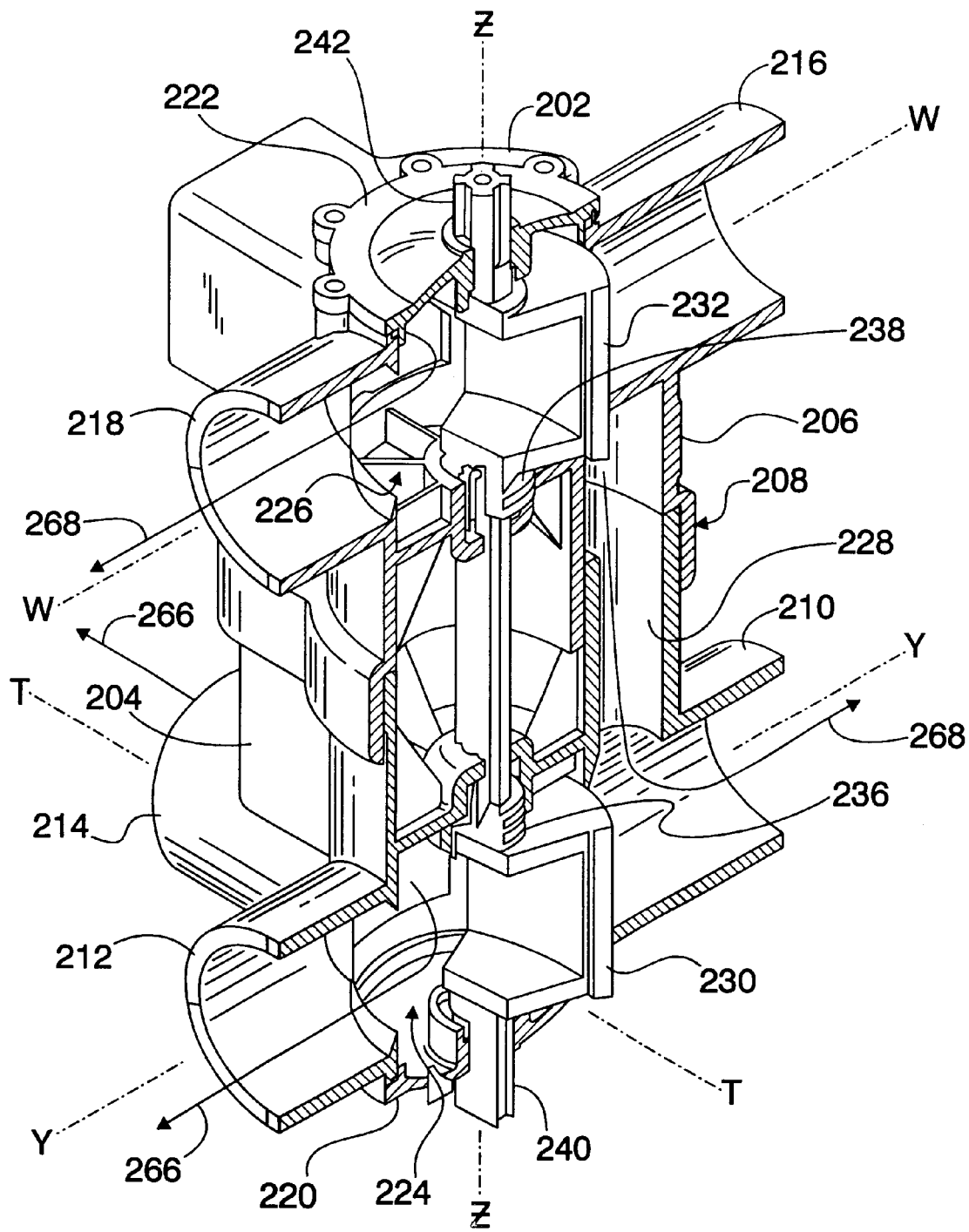
FIG. 30 is a cross-sectional perspective view of the backwash valve of FIG. 27, taken along line XXX—XXX in FIG. 27, with the valve gates in a second position.
Figure 31:
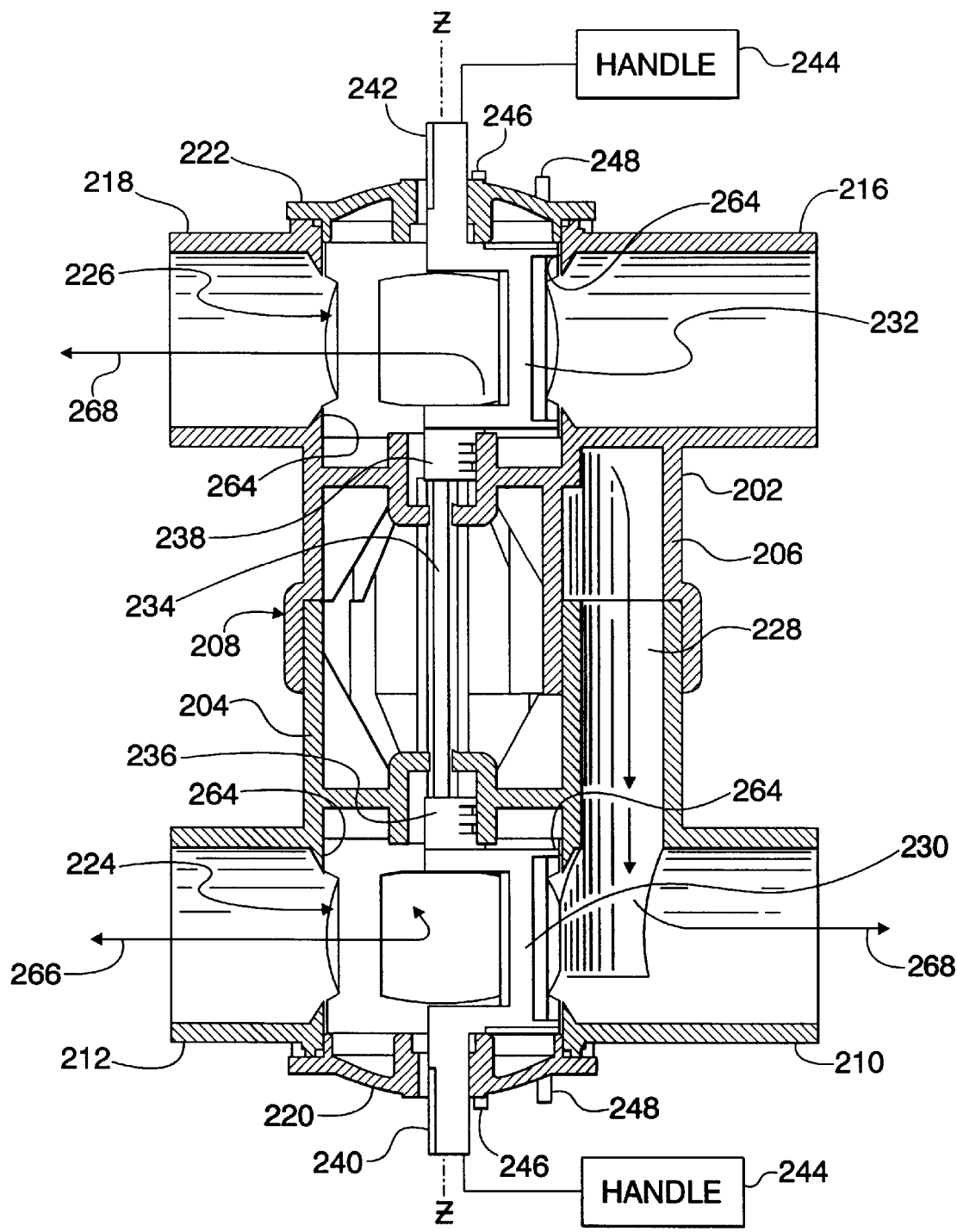
FIG. 31 is a cross-sectional view of the backwash valve of FIG. 27, taken along XXX—XXX in FIG. 27, with the valve gates in the second position.

The valve 200 further includes first 230 and second 232 diverters, or flow control gates, disposed in the first 224 second 226 flow areas, respectively. The first 230 and second 232 diverters are rotatable between a first position as shown in FIGS. 28–29 and a second position as shown in FIGS. 30–31. A shaft 234 is disposed in the housing 202 and connects the first 230 and second 232 diverters for simultaneous rotation. The first 230 and second 232 diverters are similar in construction and each include an axial stem 236,238 and an axial projection 240,242. The axial stems 236,238 are keyed to opposite ends of the shaft 234, while the axial projections 240, 242 extend from the housing 202, and more specifically covers 220 and 222, respectively, and are configured for attachment to a handle 244 (See FIGS. 29 and 31) for rotation of the first 230 and second 232 diverters between the first and second positions. Thus, the handle 244 may be attached to either end of the backwash valve 200 (either to axial projection 240 or to axial projection 242), permitting actuation of the backwash valve 200 at either end thereof. This enables the backwash valve 200 to be configured for installation in a variety of filtering systems designed by a variety of pool filter manufacturers. Further, the handle 244 may be manually or automatically operable in accordance with desired operating characteristics.

First 246 and second 248 stop projections extend from the covers 220 and 222 to engage the handle 244 and prevent rotation thereof in first and second rotational directions. For instance, when the handle 244 is rotated in the first rotational direction shown by arrow 250, it will continue to rotate until it engages the first stop projection 246. Engagement of the handle 244 with the first stop projection 246 defines the first position of the first 230 and second 232 diverters as shown in FIGS. 28–29. Similarly, when the handle 244 is rotated in the second rotational direction as shown by arrow 252, it will continue to rotate until it engages the second stop projection 248. Engagement of the handle 244 with the second stop projection 248 defines the second position of the first 230 and second 232 diverters as shown in FIGS. 30–31.

Figure 32:
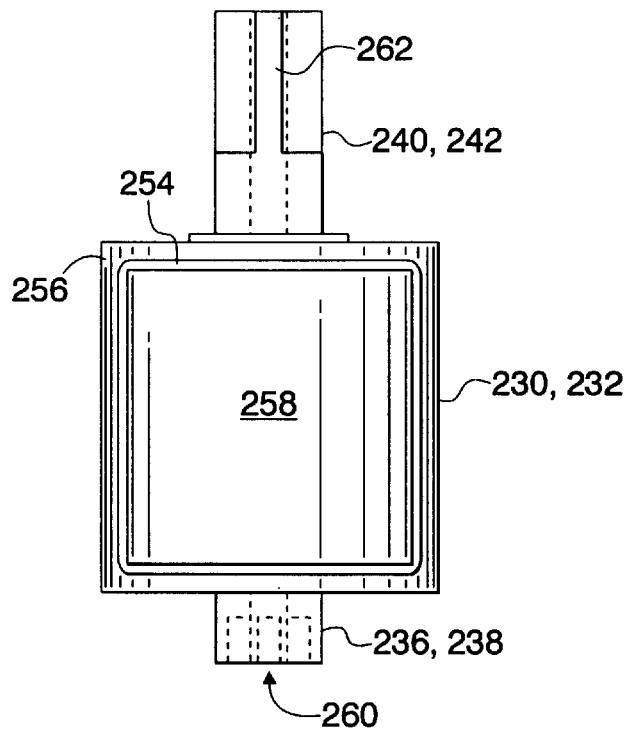
FIG. 32 is a front elevational view of a diverter utilized in the backwash valve of the present invention.
Figure 33:
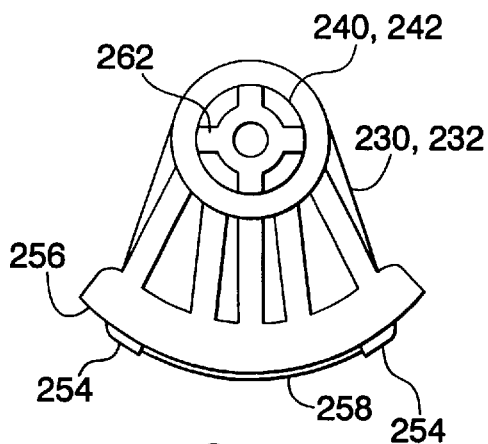
FIG. 33 is a top view of the diverter of FIG. 32.
Figure 34:
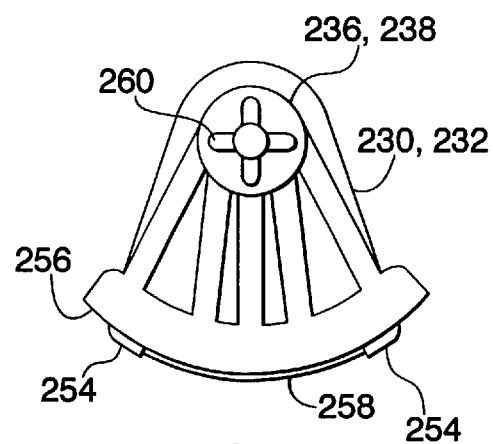
FIG. 34 is a bottom view of the diverter of FIG. 32.

FIGS. 32–34 illustrate the construction of the diverters 230,232. Each of the diverters 230,232 includes a seal 254 held in place on a face 256 of the respective diverter 230,232 by a seal retainer plate 258 in the same manner as previously described with respect to the diverters 26,28. The axial stems 236,238 include a keyed recess 260 shaped such that it will receive a correspondingly shaped end of the shaft 234 for keyed engagement therewith. The outer surface of the axial projections 240,242 is shaped with radial projections 262 such that it will engage a correspondingly shaped aperture in the handle 244 for keyed engagement therewith. Such keyed engagement of the diverters 230,232 with the handle 244 and the shaft 234 thus results in only one handle 244 being needed in order to rotate both of the diverters 230 and 232 between the first and second positions.

Referring back to FIGS. 28–31, the first 230 and second 232 diverters and the shaft 234 are preferably disposed co-axially with an actuating axis Z—Z extending through the valve 200. The first 230 and second 232 diverters are rotatable about the actuating axis Z—Z between the first and second positions. The first 210 and second 212 flow ports are preferably disposed on opposite sides of the first housing element 204 and lie along a flow axis Y—Y. Similarly, the fourth 216 and fifth 218 flow ports are also preferably disposed on opposite sides of the second housing element 206 and lie along a flow axis W—W. In a preferred form, the flow axes Y—Y and W—W are parallel, although other arrangements of these flow axes are contemplated. The third flow port 214 lies along a flow axis T—T which intersects the flow axis Y—Y at an angle. Preferably, the flow axis T—T intersects the flow axis Y—Y at a 90° angle.

Each port opening, and the flow passage opening, which opens into the first 224 and second 226 flow areas may include a seat 264, similar to the previously described seat 44, for engagement with the respective diverter 230 or 232 to prevent fluid flow through the associated port or passage. The seat 264 may include a surface formed to engage the diverter 230,232 and serves to establish a fluid-tight seal between the valve housing 202 and the diverter 230,232 when the diverter 230,232 engages the respective seat 264.

As shown in FIGS. 28–29, with the first 230 and second 232 diverters in the first position, the first diverter 230 seals off the third flow port 214 opening, while the second diverter 232 seals off the flow passage 228 opening. In this position, the first flow port 210 is in fluid communication with the second flow port 212 via the first flow area 224. Similarly, the fourth flow port 216 is in fluid communication with the fifth flow port 218 via the second flow area 226. While some of the fluid flowing through the first flow port 210 may extend up into the flow passage 228, it will not enter the second flow area 226 as a result of the second diverter 232 sealing off the flow passage 228 opening.

As shown in FIGS. 30–31, with the first 230 and second 232 diverters rotated to the second position, the first diverter 230 seals off the first flow port 210 opening while the second diverter 232 seals off the fourth flow port 216 opening. In this position, the second flow port 212 is in fluid communication with the third flow port 214 via the first flow area 224, as illustrated by fluid connection line 266. Also, with the first 230 and second 232 diverters in the second position, the first flow port 210 is in fluid communication with the fifth flow port 218 via the flow passage 228 and the second flow area 226. Fluid communication between the first 210 and fifth 218 flow ports is illustrated by fluid connection line 268. Thus, by rotating the first 230 and second 232 diverters between the first and second positions, different fluid communication configurations can be achieved through the various ports.

Figure 35:
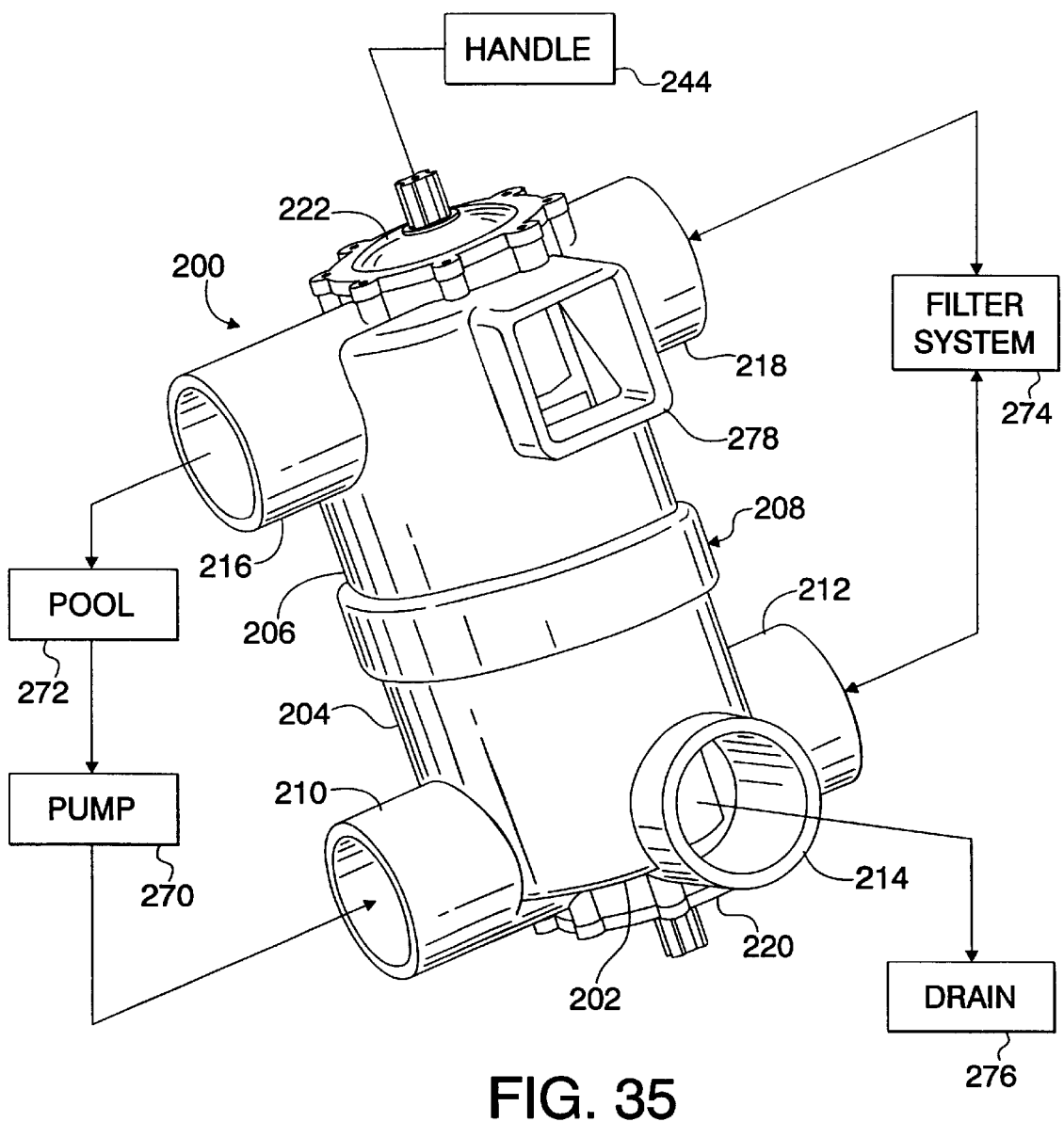
FIG. 35 is a perspective view of the backwash valve of the present invention incorporated into a filtering system.

The inventive backwash valve 200 finds particular utility when used in connection with a filtering system having a backwashable filter. FIG. 35 illustrates the valve 200 incorporated into such a system. As shown as in FIG. 35, the first flow port 210 is connected to an output of a pump 270 which draws water from a pool 272 or other fluid source. The second flow port 212 is connected to the input of a filter system 274 and the output of the filter system 274 is connected to the fifth flow port 218. The fourth flow port 216 is connected to the pool 272, while the third flow port 214 is connected to a drain 276. While the valve 200 is shown as including a square-shaped flange 278 opening into the flow passage 228, in operation, the flange 278 will include a fluid-tight cover preventing any fluid from flowing out the flange opening.

With the valve 200 in the first position, also called the "filter" position, the first 210 and second 212 flow ports are in fluid communication via the first flow area 224, and the fourth 216 and fifth 218 flow ports are in fluid communication via the second flow area 226. The pump 270 draws water from the pool 272, which water is input into the first flow port 210. The water passes through the first flow area 224 and exits the second flow port 212 and is input to the filter system 274, which includes a conventional backwashable filter having filtering media therein for the filtering of water or other fluid. The water passes through the filter system 274, where it is filtered, and is input to the fifth flow port 218. The filtered water passes through the second flow area 226 and exits the fourth flow port 216 and is input back into the pool 272. In this manner, water in the pool 272 is conventionally filtered.

With the valve 200 in the second position, also called the "backwash" position, the second 212 and third 214 flow ports are in fluid communication via the first flow area 224, and the first 210 and fifth 218 flow ports are in fluid communication via the flow passage 228 and the second flow area 226. Again, the pump 270 draws water from the pool 272, which water is input to the first flow port 210. The water passes through the flow passage 228 and the second flow area 226 and exits the fifth flow port 218. Water output from the fifth flow port 218 passes through the filter system 274 in an opposite direction, thereby backwashing the filtering media contained in the filter. The backwashed water from the filter system 274, which includes contaminants flushed from the filtering media, is input to the second flow port 212. The backwashed water passes through the first flow area 224 and exits the third flow port 214 and is directed to the drain 276. When used for such backwashing purposes, the first 246 and second 248 stop projections may include the labels "FILTER" and "BACKWASH", respectively, in close proximity thereto for ease of use.

Typically, when the valve 200 is configured for connection to a filter system 274, as shown in FIG. 35, the valve 200 is connected directly to a filter (not shown) included within the filter system 274. With the valve 200 configured for such connection, the second 212 and fifth 218 flow ports are disposed on one side of the housing 202, and the first 210 and fourth 216 flow ports are disposed on an opposite side of the housing 202. The second flow port 212 is typically connected to the filter inlet port, with the fifth flow port 218 typically connected to the filter outlet port. Connection in such manner permits the valve 200 to function as a backwash valve for the filter.

Figure 36:
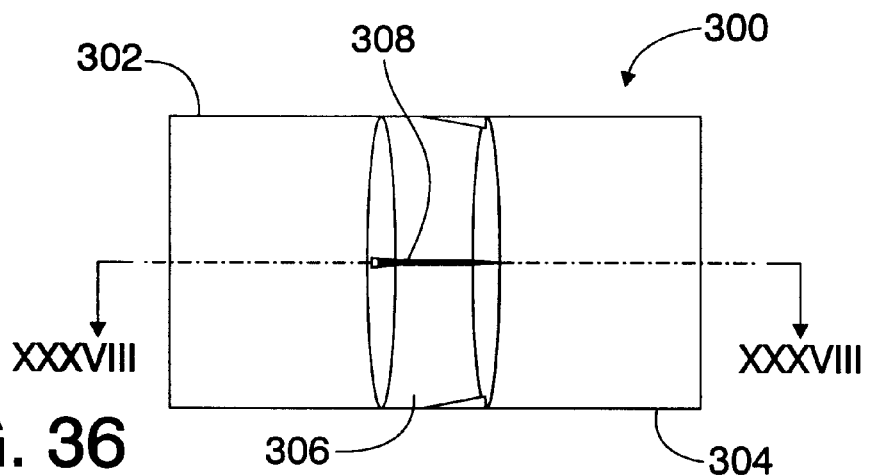
FIG. 36 is a top view of an offset coupling fitting for use with the backwash valve of the present invention.
Figure 37:
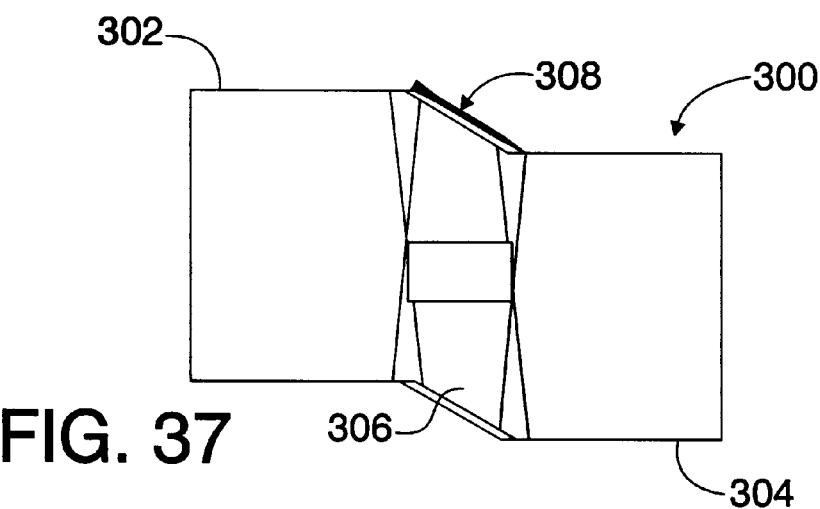
FIG. 37 is a front elevational view of the offset coupling fitting of FIG. 36.
Figure 38:
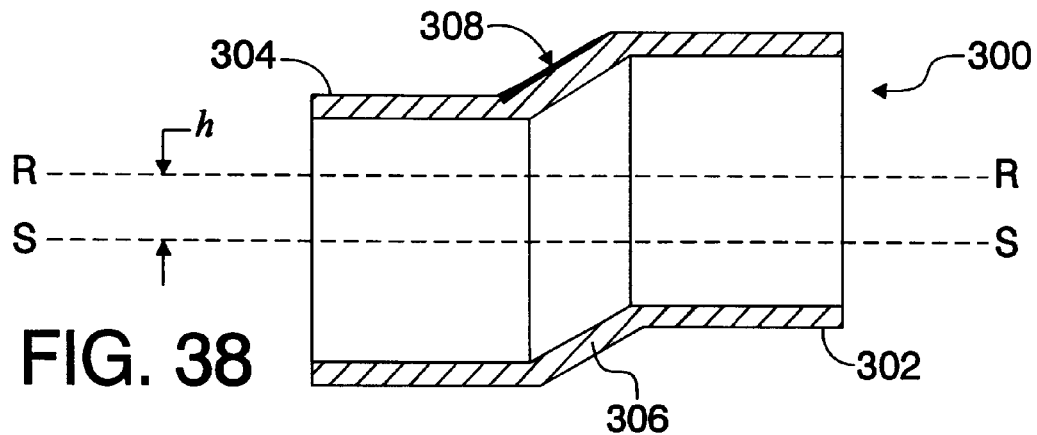
FIG. 38 is a cross-sectional elevational view of the offset coupling fitting of FIG. 36, taken along line XXXVIII—XXXVIII in FIG. 36.

Since the center distances between the filter inlet and outlet ports will vary for different types of filters manufactured by various filter manufacturers, an offset coupling fitting is provided to permit the valve 200 to be readily configured for connection to each of these different filters. Referring to FIGS. 36–38, an offset coupling fitting according to the present invention is shown at 300. The offset coupling fitting 300 may be manufactured from any of the materials previously identified for the valve 200. The offset coupling fitting 300 includes first 302 and second 304 coupling ports disposed on opposite ends thereof. Both of the first 302 and second 304 coupling ports are generally cylindrical in shape, with the first coupling port 302 configured for connection to either the second 212 or fifth 218 flow ports, and the second coupling port 304 configured for connection to either the filter inlet or outlet ports.

The first coupling port 302 has a first coupling axis R—R generally along its center line and, similarly, the second coupling port 304 has a second coupling axis S—S generally along its center line. The first 302 and second 304 coupling ports are connected by a stepped portion 306 such that their respective coupling axes are offset by a distance h, as shown in FIG. 38. Offsetting the first coupling axis R—R of the first coupling port 302 from the second coupling axis S—S of the second coupling port 304 enables the valve 200 to be readily configured for connection to different types of filters having varying center distances between their inlet and outlet ports.

Figure 39:
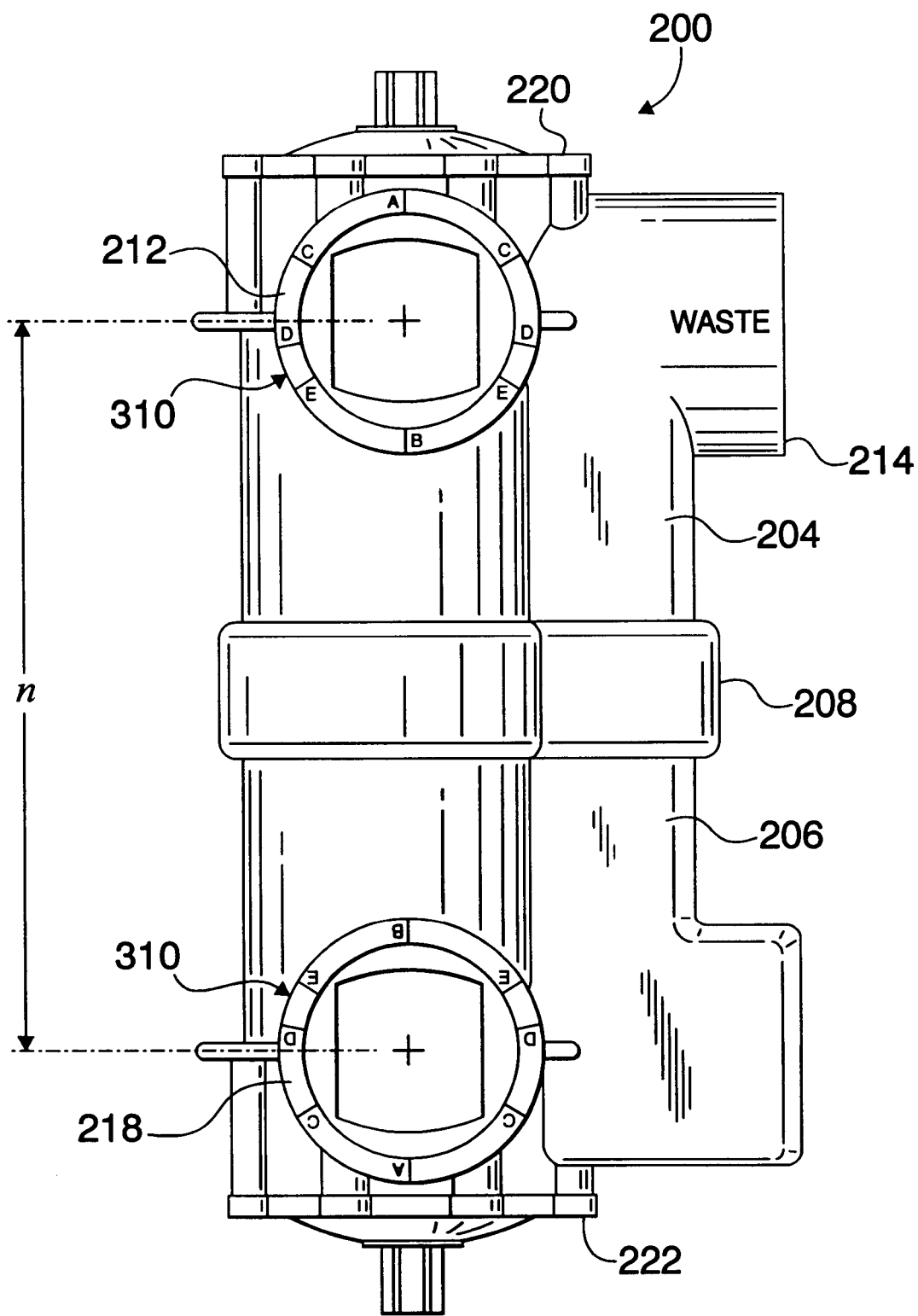
FIG. 39 is a side view of a backwash valve according to an additional embodiment of the present invention.

For example, referring to FIG. 39, the second 212 and fifth 218 flow ports of the backwash valve 200 are separated by a center distance equal to n. By connecting an offset coupling member 300 to each of the second 212 and fifth 218 flow ports, the backwash valve 200 may be readily configured for connection to filters having a center distance between their inlet and outlet ports ranging from (n+2h) to (n−2h). Preferably, the first coupling port 302 is "slip fit" into the second 212 and fifth 218 flow ports and is typically conventionally retained within the respective flow port by an appropriate attachment medium or adhesive. For example, the offset coupling fitting 300 may be affixed in the respective flow port by welding, soldering, gluing and the like.

Referring to FIGS. 36–39, for ease of configuring the valve 200 for connection to different types of filters, the offset coupling fitting 300 includes an adjustment indicator marking 308 on an outer surface of the stepped portion 306. Corresponding indicating markings 310 (A, B, C, D, E) are also provided on the faces of the second 212 and fifth 218 flow ports of the valve 200. By inserting the first coupling port 302 of the offset coupling fitting 300 into the second 212 and fifth 218 flow ports and rotating the offset coupling fitting 300 to align the adjustment indicator marking 308 thereon with select indicating marking letters 310 on the flow ports provides center distances to match various filter inlet/outlet port center distances. This enables the valve 200 to be readily configured for connection to a wide variety of filters. For example, aligning the adjustment indicator marking 308 with the indicating marking letters A on each flow port provides a maximum center distance of (n+2h). On the other hand, aligning the adjustment indicator marking 308 with the indicating marking letters B on the flow ports provides a minimum center distance of (n−2h). The remaining indicating marking letters (C, D, and E) may be preselected to conform to the inlet/outlet port center distances of popular filters. Since these indicating marking letters (C, D and E) are provided symmetrically about the face of each flow port 212 and 218, the offset coupling fitting 300 connected to each flow port may be positioned according to the particular configuration of the filter for ease of connection of the valve 200 to the filter. While in a preferred form, the second 212 and fifth 218 flow ports have a center distance spacing equal to 8 inches (n=8 inches) and the offset of the first R—R and second S—S coupling axes is 0.5 inches (h=0.5 inches), thus enabling the valve 200 to be readily configured for connection to filters having inlet and outlet port center distances ranging from 7 inches to 9 inches, the present invention is no way limited thereby. Any size valve 200 and/or offset of the offset coupling fitting 300 may be implemented without departing from the spirit and scope of the present invention.

Further, while the offset coupling fitting 300 has been described herein for connection to the second 212 and fifth 218 flow ports, the offset coupling fitting 300 may also be connected to the first 210, third 214 and/or fourth 216 flow ports in a similar manner using similar indicating markings on each flow port if so desired for particular applications.

The above-described construction of the backwash valve 200 has the additional advantage of permitting the backwash valve to be serviced without having to remove the backwash salve 200 from the piping system to which it is attached. In both the filter and backwash positions, the water flowing through the backwash valve 200 includes contaminants. These contaminants are either being pumped to the filter to be filtered, or are being flushed from the filter to a drain. Thus, to ensure proper operation, it may be necessary from time to time to service the backwash valve 200 to remove contaminant and sediment build-up within the valve and/or to remove worn diverter gates.

Conventional backwash valves typically require removal of the entire valve from the piping system to which it is attached in order to properly clean or otherwise service the valve. This wastes both time and money in the servicing of such valves. The backwash valve 200 overcomes this drawback by allowing the valve to be serviced while remaining connected to the piping system to which it is attached.

The first 224 and second 226 flow areas are accessible simply by removing covers 220 and 222, respectively. Thus, any contaminant or other sediment which may have built-up within the first 224 or second 226 flow areas may be removed with the backwash valve 200 still attached to the piping system. Further, since the diverters 230 and 232 are only keyed to the shaft 234 for rotation about the axis Z—Z, the diverters 230 and 232, as well as shaft 234, may be removed from the backwash valve 200 without having to disassemble the entire valve. Thus, the moving internal components of the backwash valve 200 may be removed for cleaning and/or replacement with the valve 200 remaining attached to the piping system. This saves both time and money associated with servicing the valve 200 to help ensure proper operation.

Those of ordinary skill in the art will recognize that many modifications and variations of the present invention may be implemented. The foregoing description and the following claims are intended to cover all such modifications and variations. While the present invention has been described with particular reference to the drawings, it should be understood that various modifications could be made without departing from the spirit and scope of the present invention. Furthermore, the materials and processes disclosed herein are merely illustrative of the present invention, and are not meant to be exhaustive. Other materials and processes may also be used to utilized the present invention without departing from the spirit and scope thereof.

We claim:

1. A valve comprising:

a housing defining (a) first and second flow areas, (b) first, second and third flow ports opening into the first flow area, (c) fourth and fifth flow ports opening into the second flow area, and (d) a flow passage having one end opening into the first flow port and another end opening into the second flow area; and first and second flow control gates disposed in the first and second flow areas, respectively, and rotatable between first and second positions, wherein in the first position the first gate seals off the third flow port opening such that the first and second flow ports are in fluid communication via the first flow area, and the second gate seals off the flow passage opening such that the fourth and fifth flow ports are in fluid communication via the second flow area, and wherein in the second position the first gate seals off the first flow port opening such that the second and third flow ports are in fluid communication via the first flow area, and the second gate seals off the fourth flow port opening such that the first and fifth flow ports are in fluid communication via the flow passage and the second flow area.

2. The valve of claim 1, further comprising a shaft disposed in the housing and connecting the first and second gates for simultaneous rotation thereof between the first and second positions.

3. The valve of claim 2, wherein at least one of the first and second gates includes a projection extending from the housing and configured for attachment to a handle for rotation of the first and second gates between the first and second positions.

4. The valve of claim 3, wherein the housing includes first and second stop projections extending therefrom and positioned to engage the handle and prevent rotation thereof in first and second rotational directions, respectively, wherein engagement of the handle with the first stop projection defines the first position of the first and second gates, and engagement of the handle with the second stop projection defines the second position of the first and second gates.

5. The valve of claim 1, wherein the housing comprises first and second housing elements, the first housing element defining the first flow area, the first, second and third flow ports, and a portion of the flow passage, and the second housing element defining the second flow area, the fourth and fifth flow ports, and a portion of the flow passage.

6. The valve of claim 1, wherein the first and second flow ports are disposed on opposite sides of the housing and lie along a first flow axis, and wherein the third flow port lies along a second flow axis that intersects the first flow axis.

7. The valve of claim 6, wherein the first flow axis is perpendicular to the second flow axis.

8. The valve of claim 1, wherein the fourth and fifth ports are disposed on opposite sides of the housing and lie along a third flow axis.

9. The valve of claim 1, wherein the valve is configured for connection to a filtering system for a fluid source, and wherein the first position of the first and second gates defines a filter position, and the second position of the first and second gates defines a backwash position.

10. A valve having an actuating axis, said valve comprising:

a housing defining (a) a first flow area coaxially aligned with the actuating axis, (b) first, second and third flow ports opening into the first flow area, (c) a second flow area coaxially aligned with the actuating axis, (d) fourth and fifth flow ports opening into the second flow area, and (e) a flow passage having one end opening into the first flow port and another end opening into the second flow area;

a first flow control gate disposed in the first flow area, the first gate coaxially aligned with and rotatable about the actuating axis between first and second positions; and a second flow control gate disposed in the second flow area, the second gate coaxially aligned with and rotatable about the actuating axis between first and second positions, wherein with the first and second gates in the first position, the first gate seals off the third flow port opening such that the first and second flow ports are in fluid communication via the first flow area, and the second gate seals off the flow passage opening such that the fourth and fifth flow ports are in fluid communication via the second flow area, and wherein with the first and second gates in the second position, the first gate seals off the first flow port opening such that the second and third flow ports are in fluid communication via the first flow area, and the second gate seals off the fourth flow port opening such that the first and fifth flow ports are in fluid communication via the flow passage and the second flow area.

11. The valve of claim 10, wherein the first and second gates each include an axial projection extending from the housing along the actuating axis and configured for attachment to a handle for rotating the first and second gates between their first and second positions.

12. The valve of claim 11, further comprising a shaft disposed in the housing along the actuating axis and engaging the first and second gates for simultaneous rotation thereof.

13. The valve of claim 10, wherein the housing comprises first and second housing elements, the first housing element defining the first flow area, the first, second and third flow ports, and a portion of the flow passage, and the second housing element defining the second flow area, the fourth and fifth flow ports, and a portion of the flow passage.

14. The valve of claim 10, wherein the first and second flow ports are disposed on opposite sides of the housing and lie along a first flow axis, and wherein the third flow port lies along a second flow axis that intersects the first flow axis.

15. The valve of claim 14, wherein the first flow axis is perpendicular to the second flow axis.

16. The valve of claim 10, wherein the fourth and fifth ports are disposed on opposite sides of the housing and lie along a third flow axis.

17. The valve of claim 10, wherein the valve is configured for connection to a filtering system for a fluid source, and wherein the first position of the first and second gates defines a filter position, and the second position of the first and second gates defines a backwash position.

18. The valve of claim 14, wherein the fourth and fifth flow ports are disposed on opposite sides of the housing and lie along a third flow axis.

19. The valve of claim 18, wherein the first and third flow axes are parallel.

20. The valve of claim 18, wherein the second and fifth flow ports are disposed on one side of the housing and are separated by a center distance equal to n, and wherein the valve further comprises first and second offset coupling fittings connectable to the second and fifth flow ports, respectively, in a plurality of rotational positions relative thereto, the first and second offset coupling fittings each include a first coupling port having a first coupling axis, a second coupling port having a second coupling axis, and a stepped portion connecting the first and second coupling ports such that the first coupling axis is offset from the second coupling axis by a distance equal to h.

21. The valve of claim 20, wherein the first and second offset coupling fittings each include an adjustment indicator marking thereon, and wherein the second and fifth flow ports include indicating markings corresponding to one another defining preset spacial distances, such that with the first coupling ports of the first and second offset coupling fittings connected to the second and fifth flow ports, respectively, and the adjustment indicator markings aligned with select corresponding indicating markings on the second and fifth flow ports, the second coupling ports of the first and second offset coupling fittings are separated by a center distance defined by the select corresponding indicating markings.

22. The valve of claim 21, wherein the adjustment indicator marking is provided on the outer surface of the first and second offset coupling fittings at the stepped portions thereof, and wherein the corresponding indicating markings are provided on faces of the second and fifth flow ports.

23. The valve of claim 10, wherein the first position of the first and second gates is oriented ninety-degrees from the second position of the first and second gates.

* * * * *